United States Patent [19]

Comerford

[11] Patent Number: 5,479,536
[45] Date of Patent: Dec. 26, 1995

[54] STROKE SYNTAX INPUT DEVICE

[75] Inventor: Liam D. Comerford, Carmel, N.Y.

[73] Assignee: International Business Machines Corporation, Armonk, N.Y.

[21] Appl. No.: 232,855

[22] Filed: Apr. 25, 1994

Related U.S. Application Data

[63] Continuation of Ser. No. 799,586, Nov. 27, 1991, abandoned.

[51] Int. Cl.[6] .............................. G06K 9/00; G06K 9/62
[52] U.S. Cl. .......................... 382/230; 345/141; 345/146
[58] Field of Search ................................. 345/141, 145, 345/146; 364/419.15, 419.19; 382/13, 37, 40, 57, 59

[56] References Cited

U.S. PATENT DOCUMENTS

| | | | |
|---|---|---|---|
| 4,190,833 | 2/1980 | Betjing et al. | 340/707 |
| 4,255,796 | 3/1981 | Gabbe et al. | 364/900 |
| 4,365,235 | 12/1982 | Greanias et al. | 382/13 |
| 4,383,307 | 5/1983 | Gibson, III | 382/40 |
| 4,438,505 | 3/1984 | Yanagiuchi et al. | 364/419 |
| 4,476,462 | 10/1984 | Feldman | 340/711 |
| 4,559,598 | 12/1985 | Goldwasser et al. | 364/419 |
| 4,573,196 | 2/1986 | Crane et al. | 382/13 |
| 4,589,142 | 5/1986 | Bednar | 382/37 |
| 4,651,145 | 3/1987 | Sutter | 340/706 |
| 4,672,677 | 6/1987 | Yamakawa | 382/13 |
| 4,754,489 | 6/1988 | Bokser | 382/40 |
| 4,918,740 | 4/1990 | Ross | 382/9 |
| 4,931,935 | 6/1990 | Ohira et al. | 364/419 |
| 4,951,033 | 8/1990 | Sakaguchi | 340/706 |

*Primary Examiner*—Jose L. Couso
*Assistant Examiner*—Chris Kelley
*Attorney, Agent, or Firm*—Whitham, Curtis, Whitham & McGinn; Robert P. Tassinari

[57] ABSTRACT

A pointing device-driven interface apparatus and method for enabling a user to enter data (in the form of options) into a computer system. User data files are maintained which indicate the relative frequency with which the user has entered sequences of options. The sequences are of a predetermined length. The user data is consulted to predict the most likely options to be entered next by the user. These options are presented to the user on a template. A stroke made by the user with the pointing device is then interpreted in light of the template and a syntax of strokes. An action associated with the interpretation is then carried out. An example of the action is communicating a character to a software application, updating the sequence, and repeating the consultation, presentation, interpretation and carrying out just described.

3 Claims, 21 Drawing Sheets

INITIAL FREQUENCY
TABLE BLOCK

INITIAL PREDICTION
TABLE BLOCK

| UN | |
|---|---|
| a | 365 |
| b | 7 |
| c | 1281 |
| d | 4788 |
| e | 475 |
| f | 132 |
| g | 57 |
| h | 5 |
| i | 2207 |
| k | 28 |
| l | 103 |
| m | 6 |
| n | 107 |
| o | 6 |
| p | 79 |
| q | 2 |
| r | 29 |
| s | 134 |
| t | 3956 |
| u | 31 |
| w | 6 |

| SUBSEQUENT FREQUENCY TABLE BLOCK | SUBSEQUENT PREDICTION TABLE BLOCK |
|---|---|
| UN | UN |

| | UN | |
|---|---|---|
| | a | 365 |
| | b | 7 |
| | c | 1281 |
| | d | 4788 |
| | e | 475 |
| | f | 132 |
| | g | 57 |
| | h | 5 |
| | i | 2207 |
| | k | 28 |
| | l | 103 |
| 514 → m | 6 | |
| | n | 107 |
| | o | 6 |
| | p | 79 |
| | q | 2 |
| | r | 29 |
| | s | 134 |
| | t | 3958 — 418 |
| | u | 31 |
| | w | 6 |
| 526 — z | 1 — 528 | |

| STEP | ENTERED TEXT | STROKE BOARD ACTIONS |
|---|---|---|
| 1 | fair _ | |
| 2 | fair c | |

Fig. 8A

| STEP | ENTERED TEXT | STROKE BOARD ACTIONS |
|---|---|---|
| 3 | fair co |  |
| 4 | fair col |  |

| STEP | ENTERED TEXT | STROKE BOARD ACTIONS |
|---|---|---|
| 5 | fair co | 630—delete / nums / punct / refresh / space / 332 334 336 338 340 / 330—u v l i d e / terminate |
| 6 | fair cou | 630—delete / nums / punct / refresh / space / 332 334 336 338 340 / 330—l u m n r d / terminate |

Fig. 8C

| STEP | ENTERED TEXT | STROKE BOARD ACTIONS |
|---|---|---|
| 7 | fair coun | nums \| punct / refresh / 630—delete / 332 334 336 338 340 / 330—s\|n\|r\|l\|t\|g / terminate / space |
| 8 | fair count | nums \| punct / refresh / 630—delete / 330 332 334 336 338 340 / e\|i\|d\|t\|c\|a / terminate / space |

Fig. 8D

| STEP | ENTERED TEXT | STROKE BOARD ACTIONS |
|---|---|---|
| 9 | fair count |  |
| 10 | fair count. |  |

| STEP | ENTERED TEXT | STROKE BOARD |
|------|--------------|--------------|
| 1 | |  |
| 2 | c |  |
| 3 | co |  |
| 4 | cou |  |
| 5 | coun |  |
| 6 | count |  |
| 7 | count |  |
| 8 | count_ |  |
| 9 | count__ |  |

STROKE SYNTAX INPUT DEVICE

This application is a continuation of application Ser. No. 07/799,586 filed Nov. 27, 1991, now abandoned.

DESCRIPTION

1. Technical Field

The present invention relates generally to a system and method for entering data into a computer system. More particularly, the present invention relates to a system and method for entering data into a computer system which provides a spatially mapped input device and a point-addressable output device.

2. Background Art

Computers which accept commands through operations performed with a spatially mapped input device are becoming commonplace. Spatially mapped input devices more commonly known as pointing devices include but are not limited to "mice" and stylus-addressed digitizing tablets. The use of stylus addressed tablets is being driven by the general trend toward more natural user interfaces utilizing handwriting and freehand drawing.

Input devices used in these systems can take a variety of forms. The stylus used with the latter could be, for example, a pen-like writing instrument or the user's finger. In many-applications, spatially mapped input devices used with "more natural" interfaces are superior to keyboards as a means for entering data. Such is the case, for instance, when a user of the computer has only one hand available for data entry. Other cases include (but are not limited to) those in which a keyboard would add too much bulk or weight to a data processing system designed to be highly portable or the case of a system designed for operation by a user who does not know how to (or is physically unable to) type.

There have been two conventional approaches to translating data entered with a spatially mapped input device into machine-interpretable codes such as ASCII, "soft" keyboards, and character recognition.

The soft keyboard approach is typically implemented by displaying a dialogue box (i.e., a window with controls that can be activated by "poking") which resembles a keyboard. The user may enter characters by pointing to, and poking, the desired key by operating the spatially mapped input device. Because character selection is explicit with this technique, data entry tends to be highly accurate.

However, because the user must move the pointer (i.e., the displayed representation of the current position of the spatially mapped input) among a large number of widely separated "keys", entry is slow. The soft keyboard does not give the user the opportunity to position fingers for successive strokes in the same time period that the current stroke is being entered, as does a real, physical keyboard. Thus, this technique is not well suited for applications which require a substantial amount of data entry.

Furthermore, displaying the soft keyboard requires a significant amount of space on a display device of a computer. On a highly portable computer, the output device may be quite small. Regardless of the size of the screen, many applications operate best when able to display output on as large an area as possible and would be less usable if they had to share screen space with a soft keyboard. Thus, the first technique would be undesirable in such cases where screen space is at a premium.

In a second technique (used almost exclusively with stylus digitizers), the user operates the input device so that the stylus trace forms a likeness of each character which is to be entered. Typically, the likeness is digitized and compared to prototypes. A "best fit" algorithm is used to identify the desired character from among the prototypes.

The second technique is intended to support a more "natural" interaction with a computer in which the common skill of handwriting largely replaces the skill of typing. For a portion of the population of computer users, this may be faster than typing. However, input speed is still limited by the requirement that full characters be rendered accurately. If they are not drawn accurately, data entry is further slowed by the need to correct erroneous recognition. Typically, the user continually monitors the interpreted characters and corrects those which do not match what he or she intended to enter.

The laborious nature of the second technique makes it poorly suited to applications which require a substantial amount of data entry. Furthermore, since the user must form the likenesses of characters with a substantial amount of dynamic precision in order for them to be recognized, the second technique would be difficult to carry out in a non-stationary environment such as in moving vehicle or on a hand-held, notebook-style computer.

In addition to the two text entry techniques, pointing devices (i.e., spatially mapped input devices) are routinely used to cause predefined commands to be executed by computers. This is accomplished either by representing a command as an icon or other graphic representation, or by providing the command as a choice in a "menu". Neither of these input operations are well adapted to entry of text. If they were applied to the entry of text, they could be described as inconvenient forms of soft keyboards.

Thus the conventional techniques each have characteristics which limit their use in applications where input by a pointing device is desirable and where a substantial amount of text entry is required. Therefore, what is needed is a pointing-device-driven interface which is adapted for such applications.

DISCLOSURE OF INVENTION

Accordingly, the present invention is directed toward a pointing-device-driven interface apparatus and method (called a stroke syntax input device) having a combination of the properties which facilitate text entry. Such properties include the ability to quickly and accurately capture the user's input, an interface with which the user can interact with naturally, a display presentation which does not require an excessive amount of space, and which is more suitable than forming characters as a means to operate in non-stationary environments.

The stroke syntax keyboard comprises two submodules. A data manager module acts on source text to prepare or update user data files. The source text comprises computer file representations of documents or collections of such representations of documents. A presenter module utilizes the user data files to provide an interface environment in which the user is able to interact with the computer to create a coded character input stream. More particularly, the presenter module provides an interface environment which, in its most simplified form, determines by means of the user data files the most likely characters to be selected next by the user, formats the presentation of those characters, and interprets the user's pointing device-entered strokes to cause characters to be selected or de-selected or to cause the presentation to be refreshed.

The modules combine to provide the user with a means to enter a character stream rapidly, accurately, and in a manner which requires minimal cognitive and physical burden on the part of the user.

As with the soft keyboard, selection of units of data with the stroke syntax input device is explicit and does not require highly accurate operation of the pointing device. Therefore, data entry with the stroke syntax input device is highly accurate, even in unstable environments.

Furthermore, the display format and syntax utilize natural hand-eye coordination skills acquired in the course of learning to handwrite. Handwriting requires the integration of a collection of component skills. The cognitive and physical effort of the stroke syntax input device of the present invention is minimized by utilizing the same skills.

One such skill is that of moving a writing instrument, facilely, from an arbitrary location to the location of the point of visual focus. In cursive handwriting, this skill is observed when a person dots an "i" which occurs at a position distant from the last character of a word. As the last character of the word is completed, the visual focus of the writer moves to a point above the "i" and the writing instrument is moved to that point. In using the stroke syntax input device, this skill is exploited when the user focuses on a symbol or command to be selected and moves the stylus to the region in which it's presented.

A second handwriting skill used by the stroke syntax input device is that of controlling the relationship of a writing device to a line. In the performance of cursive handwriting, the writer will routinely and accurately create ascenders and descenders on characters such as "b", "d", "g", and "j". The user will also move the stylus laterally without crossing a baseline to create characters such as "o" or "m". The stroke syntax input device exploits this skill by presenting regions marked with selectable characters or commands that can be reached by making stylus movements resembling those discussed above.

The foregoing and other objects, features and advantages of the invention will be apparent from the following more particular description of preferred embodiments of the invention, as illustrated in the accompanying drawings.

BRIEF DESCRIPTION OF DRAWINGS

FIGS. 4 and 5 shows an example of how prediction tables are constructed from and maintained with frequency tables;

Figure 8A:
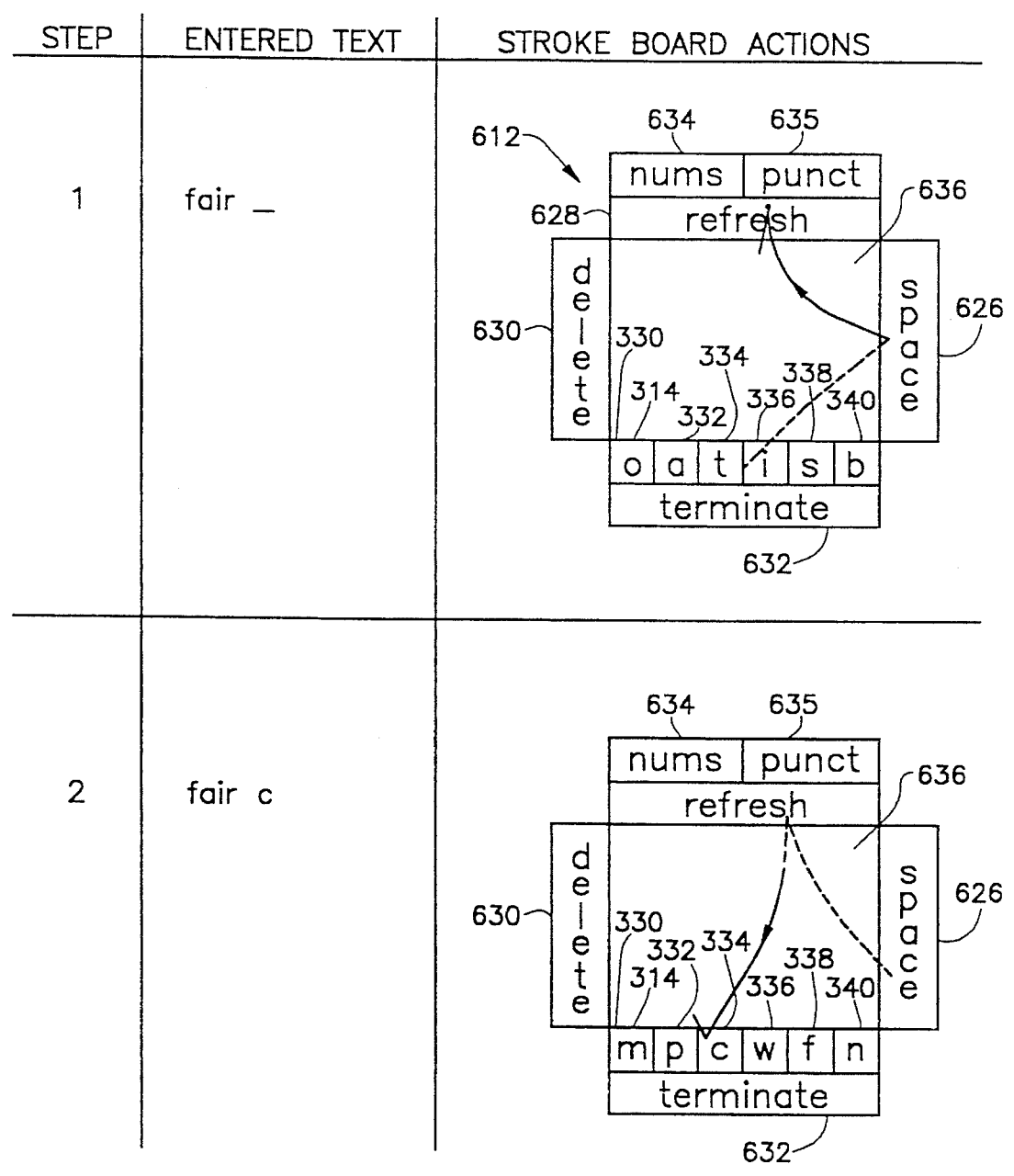

FIGS. 8A, 8B, 8C, 8D and 8E show a table of steps carried out by the user to enter a string on the first stroke board;

BEST MODE FOR CARRYING OUT THE INVENTION

1. Overview

Figure 1:
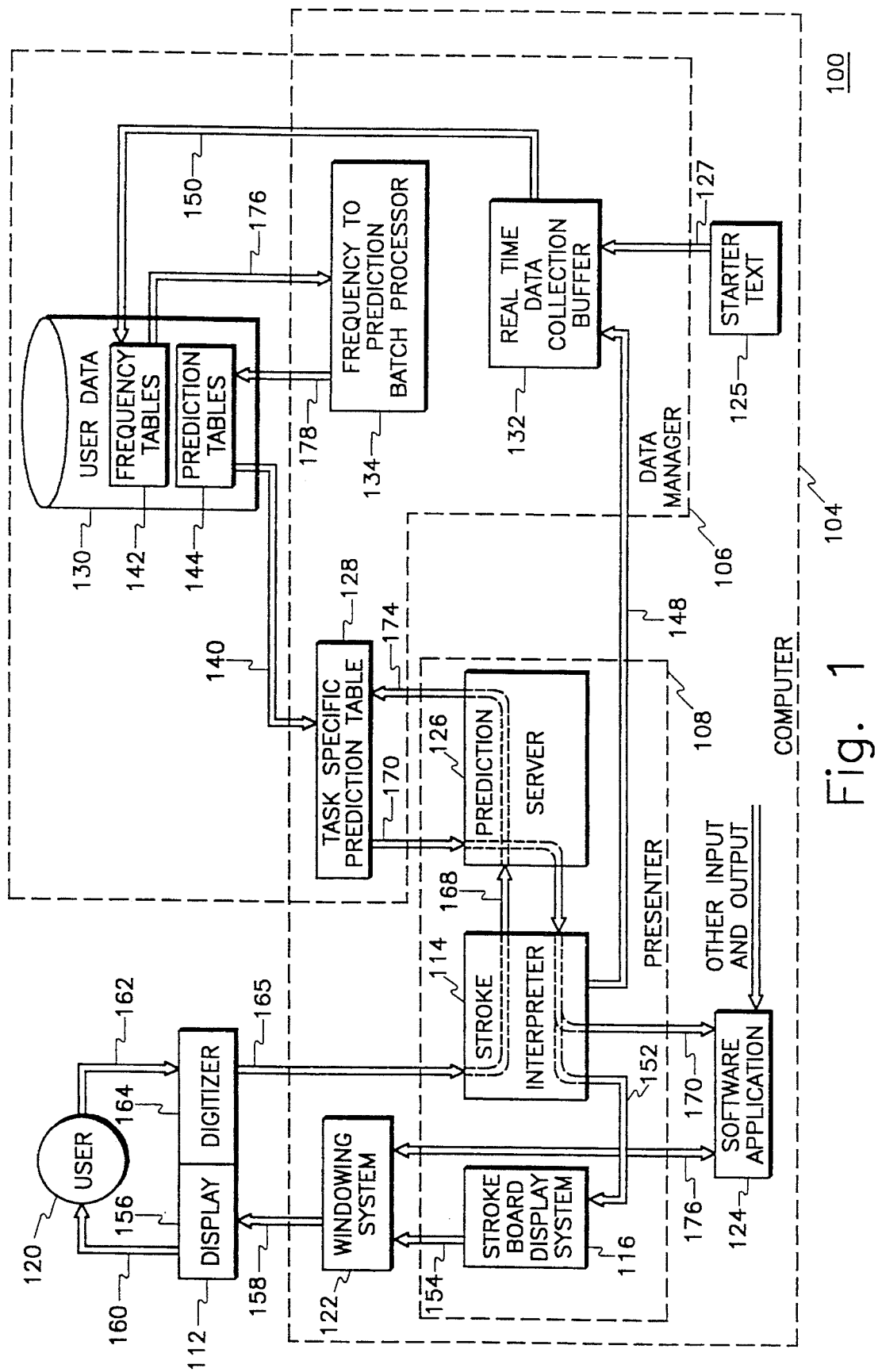
FIG. 1 is a block diagram which shows the structure of the stroke syntax input device.

The present invention is directed toward a pointing-device-driven interface apparatus and method. FIG. 1 is a block diagram of the structure of the present invention. Specifically, FIG. 1 shows a stroke syntax input device 100 which essentially comprises a data manager 106 and a presenter 108. The data manager 106 and presenter 108 interact with a user 120, a windowing system 122, a software application 124, and a spatially mapped input/output (I/O) system 112. The software application 124 could also be the operating system. The spatially mapped I/O system 112 comprises a display 156 and a digitizer 164.

The data manager 106 comprises a real-time data collection buffer 132, a frequency-to-prediction batch processor 134, on-line frequency tables 142, on-line task specific prediction tables 144, and a memory-resident task specific prediction table 128. The presenter 108 comprises a prediction server 126, a stroke board display system 116, and a stroke interpreter 114.

The above-listed components of the data manager 106 and the presenter 108 (excluding the frequency tables 142 and the prediction tables 144) are modules which are executed by a computer 104. It should be understood by those skilled in the art that although these modules could be implemented with "dedicated hardware" economy and availability dictate that a software implementation is to be preferred. It should also be understood that, to one skilled in the art, other partitions or function topologies can be implemented without departure from the spirit of the invention.

The data manager 106 and presenter 108 modules will be described briefly below and in more detail thereafter.

The frequency tables 142 and the prediction tables 144 store what is collectively referred to as user data in a non-volatile on-line storage device 130.

The frequency tables 142 indicate the number of times particular sequences of options have occurred in an input text. In preferred embodiments, the sequences are made up of three options. The three-option sequences are called trigrams. The sequences could also be made up of, for example, two options or other fixed or variable numbers of options as permitted by computing resources or dictated by application requirements. In the embodiments described below, options are characters. However, options could also be, for example, operating system commands.

The real time data collection buffer 132 monitors trigrams encountered as source text is entered. Generally, the input text is the text presently being entered by the user 120. Alternatively, a sample text 125 could be decomposed into trigrams and sent to the real time data collection buffer 132 (via a path 127) to create or enhance the frequency tables 142 and the prediction tables 144, or to improve prediction before the user 120 has entered enough data to construct meaningful frequency tables 142 and prediction tables 144. The real time data collection buffer 132 periodically empties itself and, in doing so, updates entities of one of the frequency tables 142. The frequency tables 142 contain integer representations of the number of times the user 120 has entered particular trigrams.

The prediction tables 144 indicate the relative frequency with which the user 120 has entered the trigrams. In cases where trigrams have never been observed by the system, entries for those trigrams will appear in alphabetical order following entries for trigrams which have appeared and can be ordered by frequency. The frequency-to-prediction batch processor 134 periodically uses the data in the frequency tables 142 to update the prediction tables 144.

To improve prediction, there are different frequency tables 142 and prediction tables 144 for different software applications. Accordingly, upon initialization a prediction table for a software application 124 in use is copied from the non-volatile on line storage device 130 into the computer 104. This prediction table is, thus, a memory-resident task specific prediction table 128.

The prediction server 126 uses the task specific prediction table 128 to predict the characters the user 120 will select next. The stroke board display system 116 generates a description of a template called a stroke board. The stroke board contains the predicted characters as options for selection by the user 120. The windowing system 122 (of which the IBM OS/2 Presentation Manager may be considered a typical example) provides the display management services needed to convert the stroke board description into a screen presentation. The windowing system 122 performs this conversion and writes the presentation on the display 156. Finally, the stroke interpreter 114 interprets strokes made by the user 120 according to a syntax to cause characters to be selected or de-selected, or to cause the presentation to be refreshed.

The word "stroke" used in this context refers to the user's actions with (for example) a stylus which result in a data collection representing the spatial location at which the stylus was placed in contact with the surface of the digitizer 156, the path through which the stylus was drawn across the surface of the digitizer 156, and the location at which the stylus was lifted from the surface or segments thereof. Other definitions of stroke which are suitable to other pointing devices can be made which closely parallel this definition but are adapted to that device. If a "mouse" were used, for example, the duration of the stroke would be from button-down to button-up or segments thereof rather than from stylus contact to stylus lift-off.

Thus, the interaction between the user 120 and the present invention is essentially as follows. When the user 120 addresses the display 156, a stroke board is observed which is associated with some software application or with the operating system. The user 120 operates the stylus or other pointing device to create strokes. The digitizer 164 translates each stroke into a data stream and sends the latter to the stroke interpreter 114 via a user input path 166. The presenter 108 then responds to the actions of the user 120 by interpreting the stroke. Finally, the result of the interpretation and the opportunity to enter a new stroke are presented to the user 120. As a result of the background activity of the frequency-to-prediction batch processor 134, the predictions become more finely tuned to the vocabulary and style of the user 120 in a particular context.

A design objective of the present invention is to make it easy for the user to discern characters he or she is likely to select next, comprehend how to select options on the presentation, and physically move the pointing-device so as to select such options. In furtherance of improving prediction, preferred embodiments of the present invention use different frequency and prediction tables for different applications. In furtherance of providing an effective interface, the stroke board and syntax of preferred embodiments varies according to the software application being used, the user's level of expertise, and the user's personal preference.

2. Data Manager

Each of the frequency tables 142 stores numbers reflecting the number of times the user 120 has entered each trigram while using a particular software application. Structurally, each of the frequency tables 142 is a one-dimensional array of entries. Each entry is made up of a trigram field and a frequency field. The frequency is indicative of the number of times the user 120 has entered the trigram.

The real-time data collection buffer 132 comprises an intelligent buffer which maintains the frequency tables 142. The buffer structure is similar to that of the frequency tables 142. The real-time data collection buffer 132 receives trigrams from the stroke interpreter 114 via the data path 148. When sufficiently filled, the real-time data collection buffer 132 updates the frequency tables 144 and empties itself.

Figure 15:
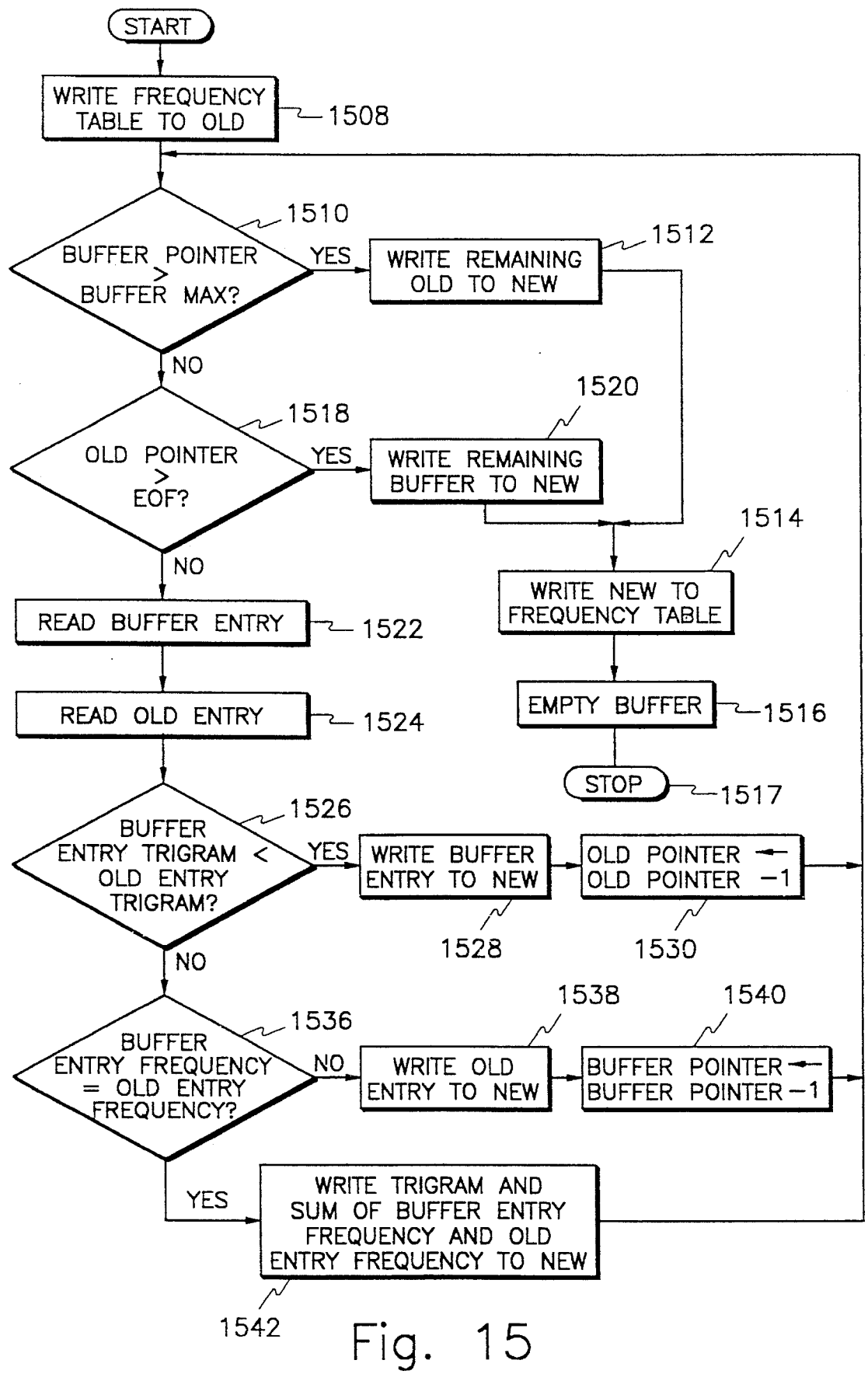
FIG. 15 is a flow chart for the method of the real time data collection buffer of FIG. 1.

FIG. 15 is a flow chart which illustrates the details of the updating and clearing method. The method merges the contents of the real time data collection buffer 132 with the contents of the appropriate frequency table using two intermediate files called "old" and "new." These files are read from or written to at a file location corresponding, respectively, to the file pointers "old pointer" and "new pointer."

In step 1508, the real-time data collection buffer 132 writes the appropriate frequency table to the old file. In step 1510, the real-time data collection buffer 132 determines whether a buffer pointer used to track frequency table updating is pointing past the end of the real time data collection buffer 142, indicating that all entries in the buffer have been processed.

If all entries in the real time data collection buffer 142 have been processed, in step 1512 the portion of the old file succeeding the old pointer is written to the new file. Then, in step 1514 the new file is written to the frequency table being updated. In step 1516, the real time data collection buffer 132 is "emptied." The real-time data collection buffer 132 then terminates its frequency table updating operation (see step 1517).

If the buffer pointer was not pointing past the end of the buffer, then in step 1518 the frequency table updating function of the real-time data collection buffer 132 determines whether the old pointer points past the end of the old file. If so, then all entries of the old file have been processed. Accordingly, in step 1520 the portion of the buffer subsequent to the buffer pointer is written to the new file. Flow of control then goes to step 1514, which is explained above.

If the old pointer did not point past the end of the old file, then in step 1522 the frequency table updating function of the real-time data collection buffer 132 reads the next entry of the buffer. In step 1524, it reads the next entry of the old file. In step 1526, the real-time data collection buffer 132 determines whether the trigram of the buffer entry precedes the same trigram of the old entry. If so, then in step 1528 the buffer entry is written to the new file. In step 1530, the old pointer is decremented so that the same trigram of the old entry will be compared to the next trigram of the buffer. Flow of control then returns to step 1510, which is explained above.

If in step 1526 the trigram of the buffer entry did not precede the trigram of the old entry, then in step 1536 the real-time data collection buffer 132 determines whether the trigram of the buffer entry equals the trigram of the old entry. If not, then the trigram of the old entry must precede the trigram of the buffer entry. Accordingly, in step 1538 the old entry is written to the new file. Then, in step 1540 the buffer pointer is decremented so that the same trigram of the buffer entry will be compared to the next trigram of the old file. Flow of control then goes to step 1510, which is explained above.

If the trigram of the buffer entry equals the trigram of the old entry, then in step 1542 that trigram and the sum of the frequency of the old entry and the frequency of the new entry are written to the new file. Flow of control then goes to step 1510, which is explained above.

Clearly, in time, the numerical fields of the frequency tables 142 may contain large numbers. Overflow or wrap errors are avoided by having the frequency to batch processor 134 scale the frequency fields either periodically or when some trigram exceeds some threshold value.

The rate at which the predictions adapt to the vocabulary and style of the user 120 will be affected by the method chosen for scaling. A preferred method is carried out as follows. Scaling is triggered on a block of a prediction table when a sum written to the block in step 1542 of FIG. 15 would exceed a predetermined threshold. A block of a prediction table is made up of all entries of the table which have a common first and second index. The threshold could be just less than the largest value representable by the frequency field. Frequencies could be scaled by simply dividing by 2. Note that division by 2 requires little computation time as it is performed with a shift right of one bit.

Frequency fields of the frequency tables 142 should be large enough to accommodate a broad range of values. Otherwise, many trigrams will be scaled to the same value, and prediction quality will deteriorate. In preferred embodiments, the frequency fields could have 16 bits of precision. Alternatively, if space were at a premium, they could have 8 bits of precision.

The prediction tables 144, store characters according to the frequency with which the user 120 has selected them. If the computer 104 on which the stroke syntax input device 100 were implemented had adequate memory, each of the prediction tables 144 could store prediction data specific to one particular software application. Structurally, if only characters are to be predicted, and tables are not kept separately for predicting according to the position of a prediction in a word, then each of the prediction tables 144 is a 26×26×26 element array of characters.

Entries of the prediction tables 144 are specified by trigram indices. Generally, each trigram index is made up of three indices. The first two indices (called a preceding sequence) are the positions of the first two characters of the desired trigram in an alphabetical ordering. Thus the indexing character pair "aa" would provide the preceding sequence 1,1 while "bz" would provide the preceding sequence 2,26. Note that a portion of a prediction table indexed by a common preceding sequence is referred to as a prediction block. The third index (called the occurrence likelihood) is the position of any given character in order of declining likelihood. For example, the most likely character to follow "aa" would be stored at location 1,1,1 in the array, the second most likely at 1,1,2, etc., while the third most likely character to follow "bz" would be stored at 2,26,3. This storage structure allows easy retrieval of next character predictions if the two preceding characters are known.

It is very likely that some trigrams will never be observed. In the event that a given trigram is unobserved, it still must be listed in the appropriate prediction table so that in the event the user 120 wishes to enter a character which will cause the first instance of that trigram, the character will be presented. These as-yet-unobserved cases are handled by alphabetized entries in the array. For example, if the trigrams "bcq" and "bcm" were the only trigrams starting with "bc" that were observed in the texts used to make the frequency tables, and "bcq" were the more frequent, then the predictions found at indices 2,3,1 through 2,3,6 would be "qmabcd"; the predictions at indices 2,3,7 through 2,7,12 would be "efghij"; and so on.

Predictions of the stroke syntax input device 100 could be improved by providing specialized prediction tables 144 adapted to the position of a character in a word. A preferred embodiment has four such prediction tables 144.

A first specialized prediction table would be consulted to predict the first character of a word. The structure of the first specialized prediction table would be a one-dimensional 26 element array of characters. The trigram index of the first prediction table is the position of any given character in order of declining likelihood. For example, the three characters most likely to occur at the beginning of a word would be stored at locations 1, 2 and 3, respectively.

A second specialized prediction table would be consulted to predict the second character of a word. The structure of the second specialized prediction table would be a 26×26 element array of characters. The trigram index for the second prediction table is made up of two indices. The first index is the position of the first character of a word in an alphabetical ordering. The second index is the position of any given character in order of declining likelihood of its occurrence as the second character of a word. For example, the three characters most likely to occur as the second character of a word starting with "t" would be stored at locations 20,1; 20,2; and 20,3, respectively.

A third specialized prediction table would be consulted to predict the third character of a word. The structure and trigram indices of the third specialized prediction table are the same as those for the general prediction tables 144 described above.

A fourth specialized prediction table would be consulted to predict a character not occurring as the first, second, or third character of a word. The structure and trigram indices of the fourth prediction table are the same as those for the general prediction tables 144 described above.

Implementation of specialized prediction tables for predictions beyond the third character of words would be obvious to one of skill in the art, and would not require a substantial amount of additional memory.

Additionally, there could be a punctuation prediction table and a numeric prediction table associated with each software application. The structure and trigram indices for the punctuation and numeric prediction tables are the same as those for the first specialized prediction table. The punctuation prediction table contains punctuation marks and control characters such as "carriage return" and "tab". The numeric prediction table contains the numerals "0" through "9" and mathematical symbols such as "+" and "−".

The frequency tables 142 are written to at appropriate times by the real time data collection buffer 132. Accordingly, the structure of the frequency tables 142 facilitates indexing by trigram and frequent modification of the number of times trigrams have occurred. The prediction tables 144, on the other hand, are continually accessed by the prediction server 126. Accordingly, the data structure of the prediction tables 144 facilitates determining the character which has occurred with a specified relative frequency after a given two-character sequence. The frequency to batch processor 134 bridges the gap between the two data structures.

The frequency to batch processor 134 updates the prediction tables 144 using the data in the frequency tables 142 as follows. First, it reads a block of one of the frequency tables 142 from the non-volatile on-line storage device 130 (via a data path 176). The entries of the frequency table block are then sorted so that their frequency fields are in descending order. Associated with each of the entries is the third character of the trigram which the entry represents. The third characters of the trigram fields are written to the prediction block of the prediction table associated with the same software application and same first and second index as the frequency table block. The characters are written in the sorted order. In other words, they are written so that the characters in the prediction block are in order of declining likelihood.

If a trigram has not occurred in the source text, there will be no entry for it in the frequency table block. Accordingly, the frequency-to-prediction batch processor 134 then determines the characters for which there were no entries in the frequency table block, sorts these characters so as to arrange them in alphabetical order, and writes them (in order) to the prediction block (via the path 178). Therefore, in the prediction block the alphabetized characters immediately follow the characters written from the frequency table block.

3. Presenter Module

Figure 2A:
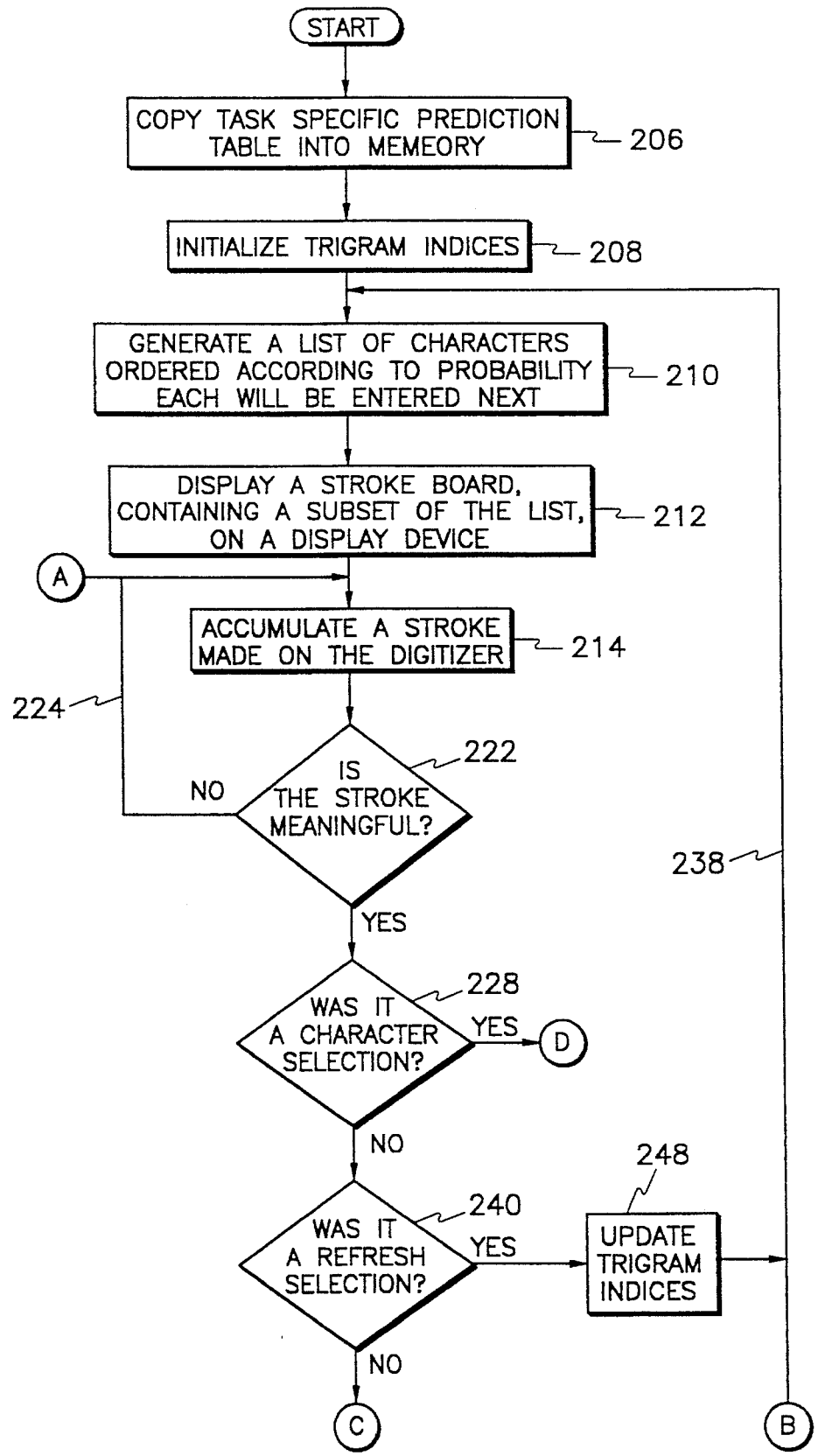
FIGS. 2A and 2B show a flow chart for the method of the stroke syntax input device of FIG. 1.
Figure 2B:
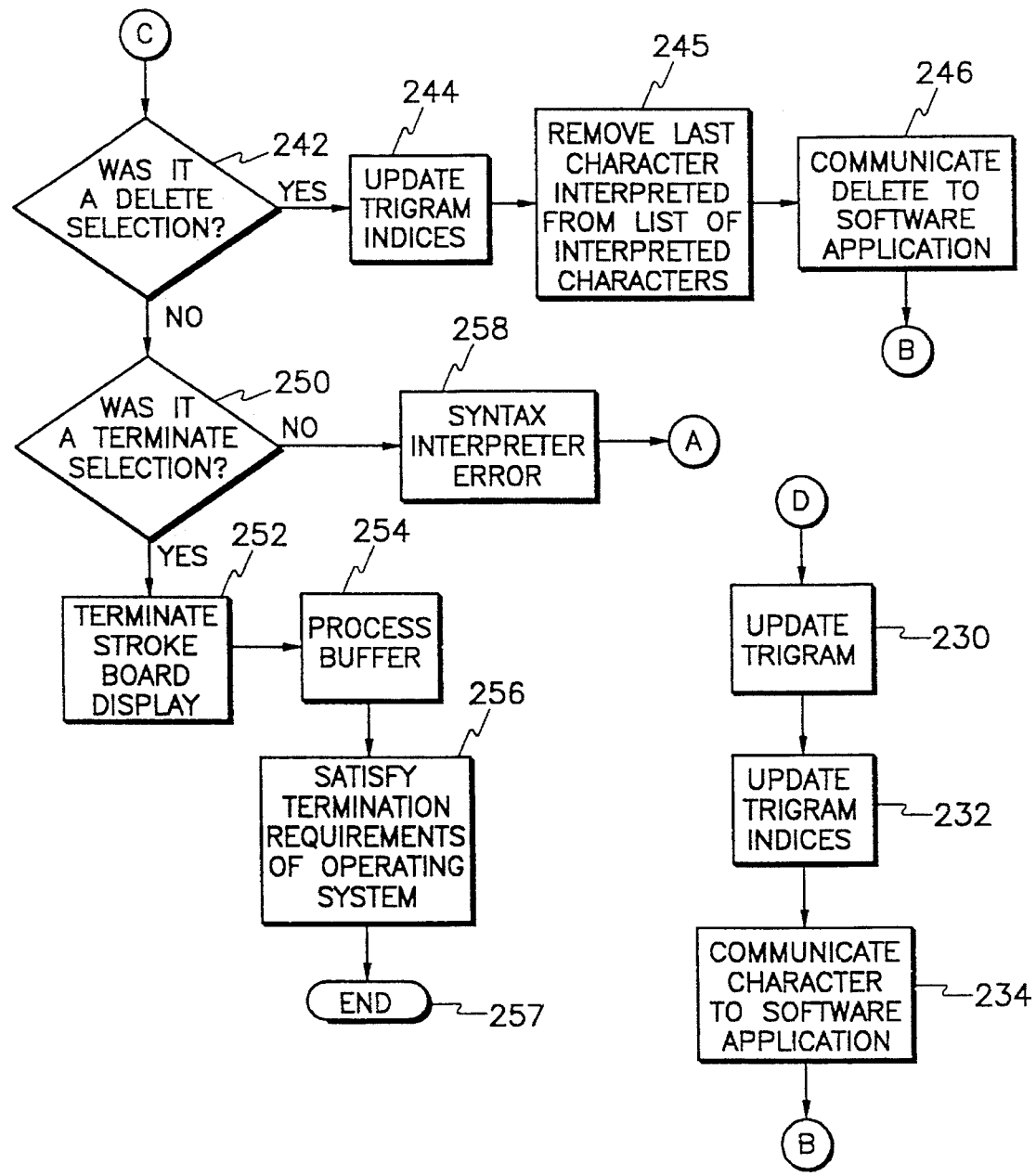

FIG. 2 shows a flow chart for the method of the presenter 108. The flow chart also illustrates the interaction of the modules of the stroke syntax input device 100.

At start-up, the prediction table 144 corresponding to the software application 124 in use is copied (via a data path 140) to the memory of the computer 104. (See step 206.) The copy in the computer 104 is the task specific prediction table 128.

The stroke interpreter 114 then signals the prediction server 126 (via a data path 168) to perform an initial prediction. The stroke interpreter 114 could generate such a signal by setting the preceding sequence of trigram indices to the alphabetic positions of characters likely to precede the beginning of a sentence. (See step 208.) Such characters could be, for example, "period blank" or "blank blank". For an implementation of the present invention which displayed n characters on the stroke board, the stroke interpreter 114 could set the occurrence likelihoods of the trigram indices to the numbers 1 through n. A common value of n would be 6.

Next, the prediction server 126 accesses the task specific prediction table 128 (via a data path 170) with the trigram indices set by the stroke interpreter 114. The prediction server 126 thereby generates a list of characters ordered according to the probability that each will be entered next. (See step 210.) The prediction server 126 sends these characters (called predicted characters) through the stroke interpreter 114 to the stroke board display system 116 (via a data path 152).

The stroke board display system 116 then generates a description of a stroke board having the predicted characters as options for selection by the user 120. (See step 212.) The stroke board may also have an option to indicate that the desired character is not presented as an option. In preferred embodiments, options are presented in two-dimensional boxes.

The windowing system 122 receives the stroke board description from the stroke board display system 116 (via a data path 154), converts the stroke board description into a screen presentation, and sends the screen presentation data to the display 156 via a data path 158.

The user 120 then selects an option by forming an appropriate stroke on the digitizer 164. If the user 120 is using a stylus, appropriate strokes may include putting a stylus down in the box with the symbolic representation of the desired option or moving the stylus into the box. If the user 120 is using a mouse, appropriate strokes may include clicking on the box or moving the cursor into the box. The form of a selection stroke is dependent on the syntax used with a particular presentation of the stroke board.

The digitizer 164 transmits the points comprising the strokes via a data path 166 to the stroke interpreter 114 which accumulates the points comprising the stroke (see step 214). The stroke interpreter 114 determines whether the accumulated stroke is meaningful. (See step 222.) A stroke which is not meaningful is either incomplete or violates the syntax currently in use. If the stroke is not meaningful, then the stroke continues to accumulate in the stroke interpreter 114. (See path 224.)

If the accumulator stroke is meaningful, then the stroke interpreter 114 interprets it. The stroke interpreter 114 performs the interpretation by analyzing the accumulated stroke with respect to the syntax currently in use and the options currently displayed on the stroke board.

If the accumulated stroke is interpreted to be a selection of one of the predicted characters or of the space character (see step 228), then the interpreted character is processed as follows. The stroke interpreter 114 forms a trigram made up of the last three characters interpreted (see step 230), and communicates it to the real time data collection buffer 132 via the path 148. The stroke interpreter 114 then updates the trigram indices by setting the first indices to what were formerly the second indices and setting the second indices to the alphabetic position of the interpreted character. The occurrence likelihoods remain the numbers 1 through n. (See step 232.) The stroke interpreter 114 then sends the updated trigram indices to the prediction server 126 via the path 168.

Next, the windowing system 122 receives the interpreted character from the stroke interpreter 114 (via the data path 152 to the stroke board display system 116 and the data path 154 to the windowing system 122) and routes it to the software application 124 (via the data path 176). (See step 234.) Alternatively, the stroke interpreter 114 could send characters to the software application 124 through a more direct interface such as a keyboard queue of the software application 124.

Upon receiving a character from the stroke interpreter 114, the software application 124 may use the windowing system 122 to display the character as part of some text. This text may also be a command. Flow of control then returns to step 210, (explained above) to consult the task specific prediction table 128 with the updated trigram indices. (See path 238.)

If the accumulated stroke was interpreted as an indication that the desired character is not presented on the stroke board (see step 240), then the stroke board must be refreshed so as to display the next set of n predicted characters. Accordingly, the stroke interpreter 114 adds n to each of the occurrence likelihoods of the trigram indices. (See step 248.) For example, if the stroke board had been displaying the six most likely characters to follow the sequence "th" when refreshed, the trigram indices would be updated from "20, 8, 1" through "20, 8, 6" to "20, 8, 7" through "20, 8, 12". Flow of control then returns to step 210.

This refreshing process can continue until the character which is desired is displayed, even if this requires returning to display of the original set of six predictions after the complete set of character with the initial trigram indices have been shown once. In this way, even if the user 120 has erroneously chosen to refresh the presentation despite the presence of the desired character, the character will eventually be re-displayed.

Alternatively, refresh options could be differentiated into more than one form i(as will be shown in FIGS. 6 through 14) so that the display may present the next most likely set of letters, the set of punctuation marks, the set of numbers, etc.

If the stroke was interpreted as a request to delete the last character interpreted (see step 242), then processing is as follows. The stroke interpreter 114 updates the preceding sequences of the trigram indices by setting the second indices to the first indices and setting the first indices to the value of the first indices before the last character was selected. (See step 244.) For example, if the last three characters selected were "t", "h" and "a", and the "a" were deleted, then the preceding sequences would be updated from the alphabetic positions of "h" and "a" to the alphabetic positions of "t" and "h". The occurrence frequencies would remain 1 through n. The stroke interpreter 114 then sends the updated trigram indices to the prediction server 126.

The stroke interpreter 114 maintains a list of characters most recently interpreted. Accordingly, the stroke interpreter 114 then removes from this list the last character interpreted. (See Step 245.)

The stroke interpreter 114 next sends a delete code to the windowing system 122 (via the path 152 to the stroke board display system 116 and the path 154 to the windowing system 122). The windowing system 122 sends the delete code to the software application 124 (via the path 176). (See step 246.) Alternatively, the character could be deleted from the keyboard cue of the software application 124.

The software application 124 may then use the windowing system 122 to remove the character from the display 156. Alternatively, if the software application 124 had interpreted the character as a command, then it could undo the command. Flow of control then returns to step 210, which is explained above. (See path 238.)

If the accumulated stroke was interpreted to request that the stroke board input device 100 be terminated (see step 250), then the processing is as follows. The stroke interpreter 114 signals the windowing system 122 (via the path 152 to the stroke board display system 116 and the path 154 to the windowing system 122) to remove the stroke board from the display 156. (See step 252).

The stroke interpreter 114 then informs the real time data collection buffer 132 (via the path 148) that it has interpreted a termination stroke. The real time data collection buffer 132 then empties itself by updating the frequency table 142 associated with the currently running software application 124 (via the path 150). (See step 252.) Finally, the stroke syntax input device 100 satisfies any program termination requirements of the operating system. (See step 256.) Such requirements could include, for example, freeing any memory it has allocated. The stroke syntax input device 100 then ceases operation. (See step 257.)

If the accumulated stroke was not interpreted to be a character selection, a refresh selection, a delete selection or a terminate selection, then the stroke did not conform to the syntax currently in use. (See step 258.) Flow of control then returns to step 214, which is explained above. This event indicates a software error has occurred.

4. Table Maintenance

The frequency-to-batch processor 134 maintains the prediction tables 144 using data in the frequency tables 142. FIGS. 4 and 5 show how this is done. Specifically, FIG. 4 shows an example of an initial frequency table block 410 and an initial prediction table block 412, and FIG. 5 shows a subsequent frequency table block 514 and a subsequent prediction table block 516. The table blocks shown are those associated with the sequence "un". It should be understood that the "un" blocks are preceded by the "um" blocks and followed by the "uo" blocks and so on.

Looking at the initial frequency table block 410, the number field of a "t" entry 420 is 3956, which is the number of times the sequence "unt" has occurred in the source text. The initial frequency table block 410 has no "z" entry. This indicates that the sequence "unz" has not occurred in the source text.

The frequency-to-prediction batch processor 134 generates the initial prediction table block 412 from the initial frequency table block 410. The second entry 422 of the initial "un" prediction table block 412 is "t" which indicates that "t" has occurred in the source text second most frequently after "un". A twenty-sixth entry 424 of the initial prediction table block 412 is "z". (The twenty-sixth entry 424 is the last entry of the table.) No frequency data exists at this point in the example for the trigram "unz". Accordingly, the "z" is among the characters at the end of the initial prediction table block 412 which are placed in alphabetical rather than frequency order.

Given the initial frequency table block 410 and the initial prediction table block 412 if the strings "count" "country" and "funzap" were to occur in the source text, then the trigrams in these words would be added to the real-time data collection buffer 132. At some time in the operation of the stroke syntax input device 100, the real time data collection buffer 132 generates the subsequent frequency table block 514 from the combination of the real-time data it contains and the initial frequency table block 410.

The sequence "unt" occurs twice in the three words entered. Accordingly, the number field 418 of the "t" entry 420 of the subsequent frequency table block 514 has increased by two to 3958. The sequence "unz" occurs once in the three words entered. Accordingly, a "z" entry 526 is created for the subsequent frequency table block 514 with a number field 528 of one.

The process described above will accumulate models (expressed as trigram frequencies) of the user's vocabulary and usage for various software applications in the form of application-specific frequency tables. It is the job of the frequency-to-prediction batch processor 134 to convert these models into the prediction tables 144.

The frequency-to-prediction batch processor 134 is invoked on an available data and/or an available cycles basis. For example, it could be invoked nightly at a time when use of the computer 104 is low, and more often if the user 120 was rapidly entering data.

The general operation of the frequency-to-prediction batch processor 134 is explained above. The frequency-to-prediction batch processor 134 in this example amends the initial prediction table block 412 to obtain the subsequent frequency table block 514. As with the initial prediction table block 412, the second entry 432 of the subsequent prediction table block 516 is "t". This indicates that there is still exactly one character ("d") which has been encountered in the source text more often after "un" than "t".

The character "z" is a twenty-first entry 532 of the subsequent prediction table block 516. The "z" was moved up from the twenty-sixth entry 424 ahead of four characters ("j" "v" "x" and "y") which had still not been encountered after "un".

5. Character Prediction

Figure 3:
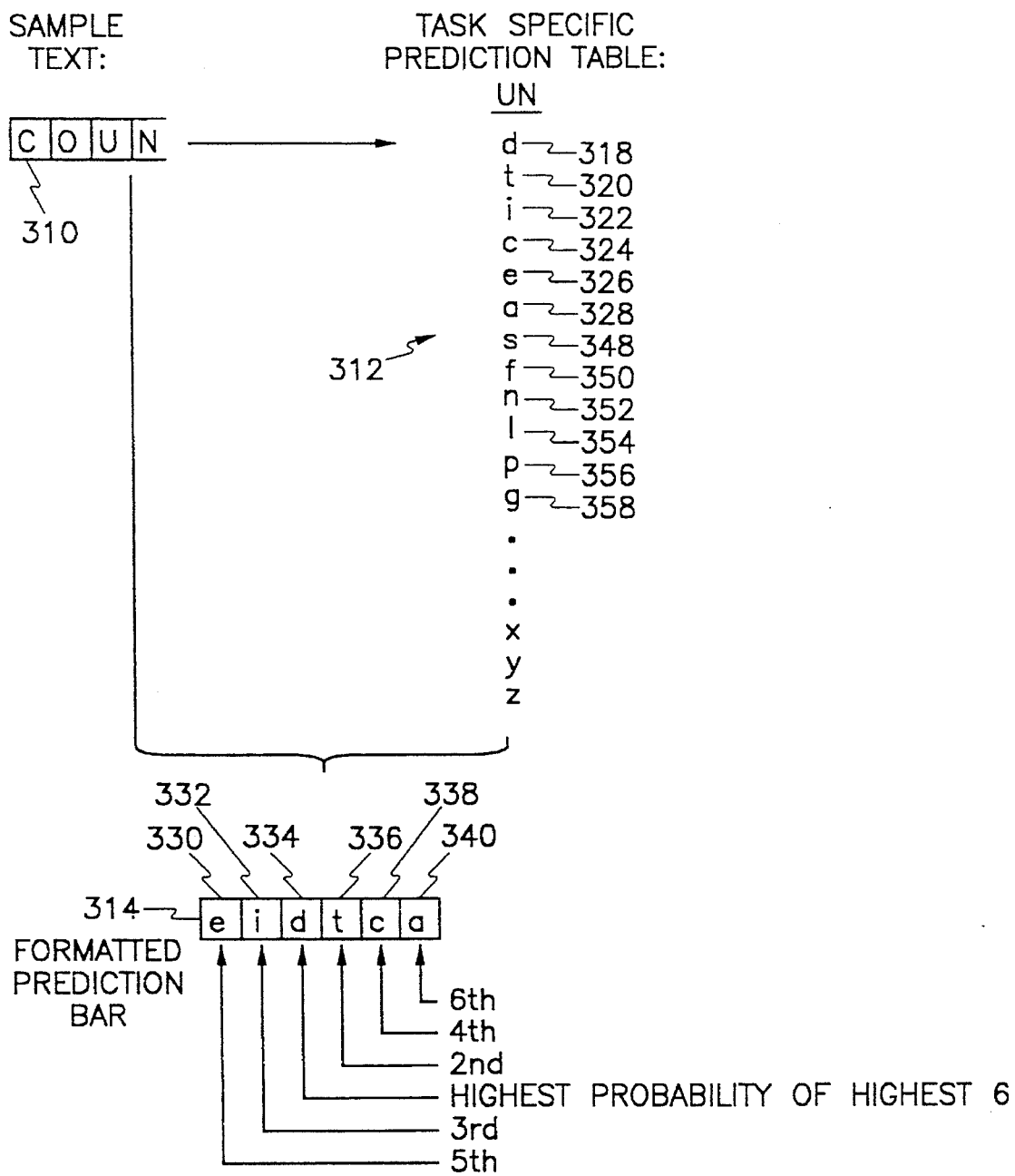
FIG. 3 shows an example of how the stroke syntax input device of FIG. 1 uses a task specific prediction table to predict and display characters most likely to be entered next.

FIG. 3 shows an example of how the stroke syntax input device 100 would carry out the steps 212, 214 and 248 of FIG. 2. Specifically, FIG. 3 shows sample text 310, a sample task specific prediction table block 312 having a plurality of entries, and the part of the display device 156 on which a sample prediction bar 314 is presented. In the example, the user 120 has just entered the string of characters, "coun". Step 212 is carried out as follows. The stroke interpreter 114 sends the trigram indices for "u, n, 1" through "u, n, 6" to the prediction server 126. The prediction server 126 returns the first six entries 316, 318, 320, 322, 324 and 326, respectively, of the task specific prediction table block 312. The entries are the characters "d", "t", "i", "c", "e" and "a", respectively. Six characters are selected because this is both a small enough number of characters for the user 120 to scan rapidly and is a large enough number for the probability of the selection containing the desired character to be high.

The stroke board display system 116 carries out the step 214 as follows. The stroke board display system 116 presents the predicted characters in character boxes 330, 332, 334, 336, 338 and 340 of the prediction bar 314. The most likely predictions are presented in the middle of the prediction bar 314, and the least likely predictions are presented on the left and right sides of it. The number and arrangement of the characters on the prediction bar 314 are chosen so as to maximize visibility and minimize stylus travel. It should be understood, however, that other arrangements may be chosen for that purpose without departing from the spirit of the invention.

Specifically, the stroke board display system 116 arranges the six characters on the prediction bar 314 as follows. The "d" in the first entry 316 of the task specific prediction table 128 is displayed in the character box 3:34 of the prediction bar 314. The "t" in the second entry 318 is displayed in the character box 336. The "i" in the third entry 320 is displayed in the character box 332. The "c" of the fourth entry 322 is displayed in the character box 338. The "e" in the fifth entry 324 is displayed in the character box 330. The "a" in the sixth entry 326 is displayed in the character box 340.

Refreshing the prediction bar 314 involves steps 248, 212 and 214 and is carried out on the example as follows. The stroke interpreter 114 carries out the step 248 by adding 6 to each third index of the trigram indices to produce the trigram indices fox "u, n, 7" through "u, n, 12". In carrying out step 212, the stroke interpreter 114 sends the trigram indices to the prediction server 126. The prediction server 126 returns the seventh through twelfth entries 348, 350, 352, 354, 356 and 358, respectively, of the task-specific prediction table segment 312. The entries are "s", "f", "n", "l", "p" and "g", respectively. The stroke board display system 116 carries out the step 214 by generating the prediction bar 314 with these characters in the character boxes 334, 336, 332, 338, 330 and 340, respectively.

It is important to understand that while the foregoing material has been described in terms of using a single task-specific table for generating a fixed number of next-character predictions, it is within the scope of this invention to use both multiple tables and multiple prediction methods. An example of use of multiple tables is described in detail above (in the section entitled "Data Manager").

Examples of other prediction methods could include language models that recognize when words have been formed so that word endings could be presented as options. A language model could also recognize the frequency with which whole words follow other words so that if a high probability word existed, the whole word could be presented as a selection along with letters or varying length parts of words. Such prediction methods could be implemented by modifying the prediction tables 144 to include not only characters but also pointers to strings of characters.

The number of predicted characters presented on the prediction bar 314 could be altered to reflect the certainty of a given prediction, as could the area devoted to the character. In this form, the most likely character would occupy the largest display space. These two variations could simplify the cognitive task of finding the desired character.

Implementation of these two variations requires that, in addition to storing the characters in order of decreasing likelihood of being selected, the prediction tables 144 would need to store the probabilities themselves. With such data, the prediction server 126 and the stroke board display system 116 could cooperate to alter the presentation on the prediction bar 314 as described above. Implementation of these two variations, however, is made at the cost of a substantial increase in the space required to store the prediction tables 144.

6. First Stroke Board Display Format a. Overview

Figure 6:
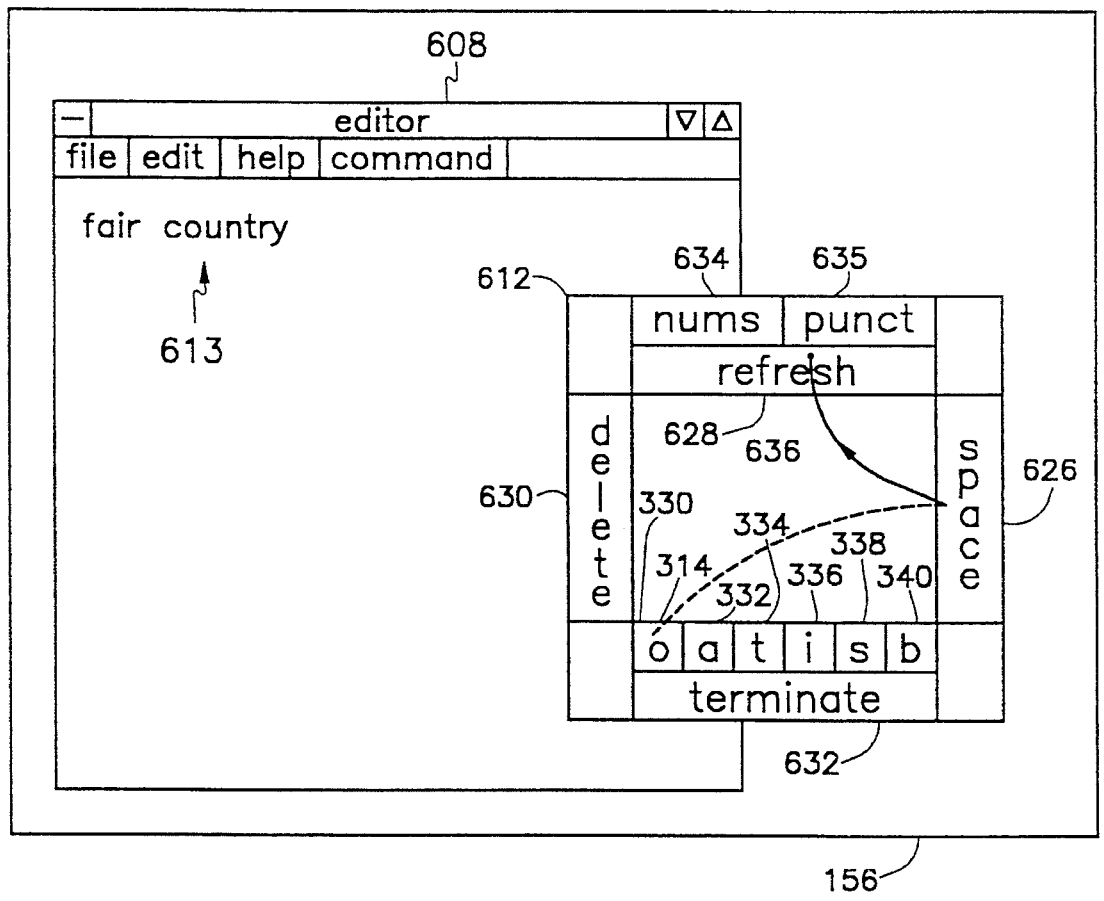
FIG. 6 shows the presentation of a first stroke board on a display device in a windowing environment.

FIG. 6 shows the presentation of a first stroke board display format on the display device 156 in a windowing environment. Presented on the display device 156 is an editor window 608 and a first stroke board 612. The editor window 608 shows entered text 613.

The first stroke board 612 comprises a number of boxes, each of which is associated with an option specifying an action to be carried out. Specifically, the stroke board 612 comprises the prediction bar 314 of FIG. 3, a space box 626, a refresh box 628, a delete box 630, a terminate box 632, a numbers box 634, a punctuation box 635 and a stroke space box 636. The character boxes 330, 332, 334, 336, 338 and 340 of the prediction bar 314 contain the characters "o", "a", "t", "i", "s" and "b", respectively.

b. Syntax

Figure 7:
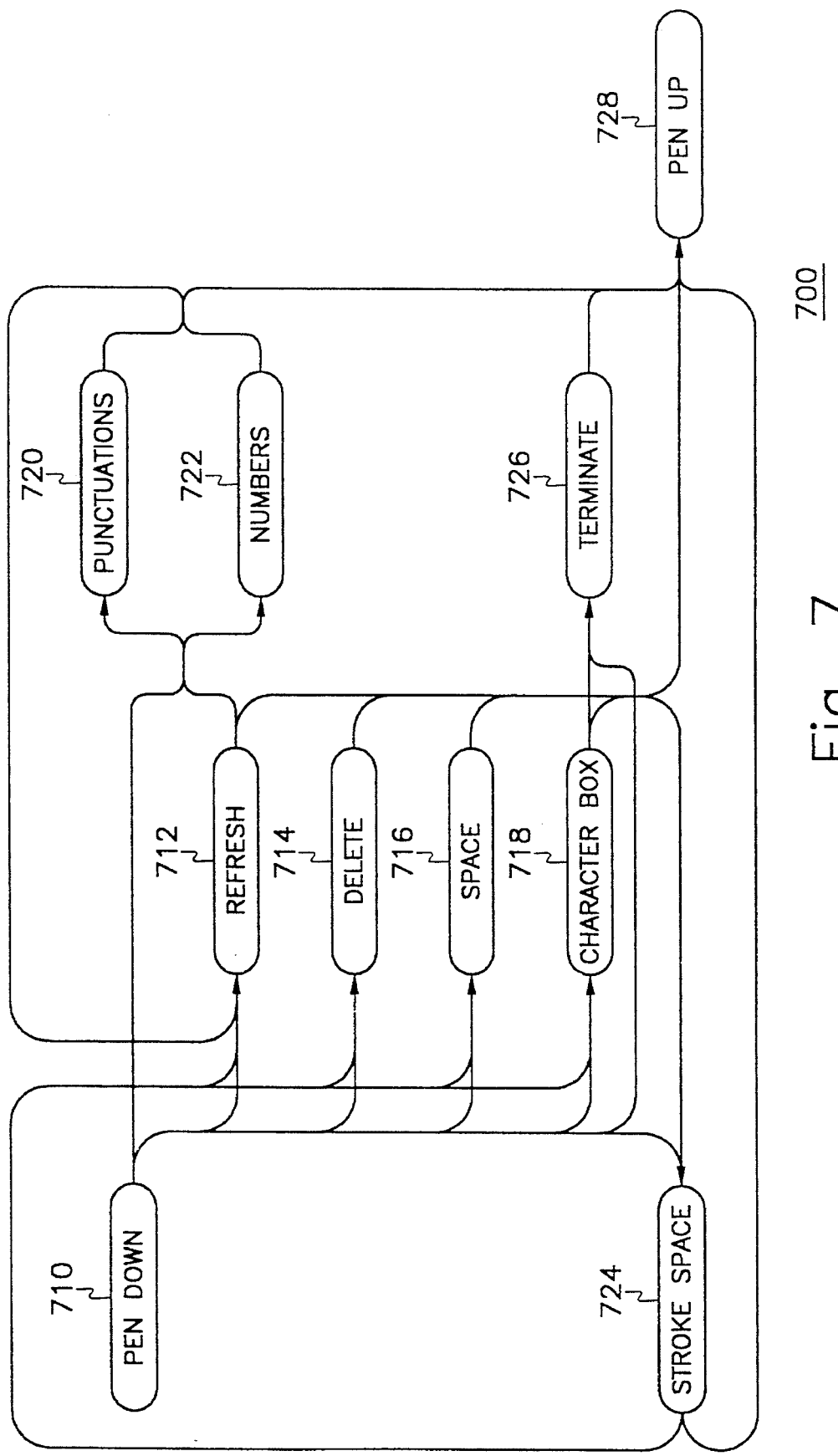
FIG. 7 shows a syntax chart for string entry with the first stroke board.
Figure 8B:
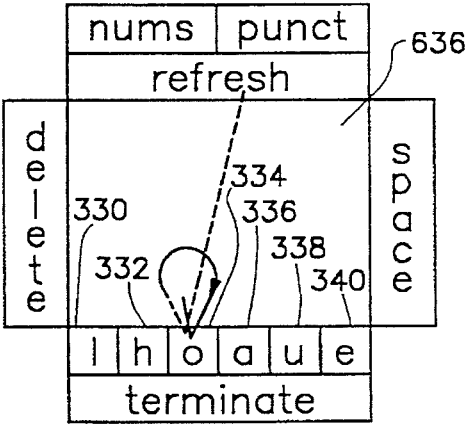
Figure 8B:
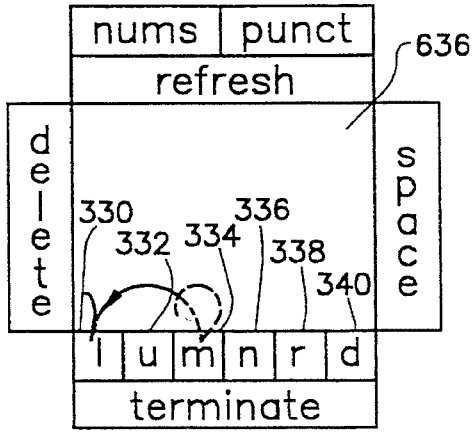
Figure 8E:
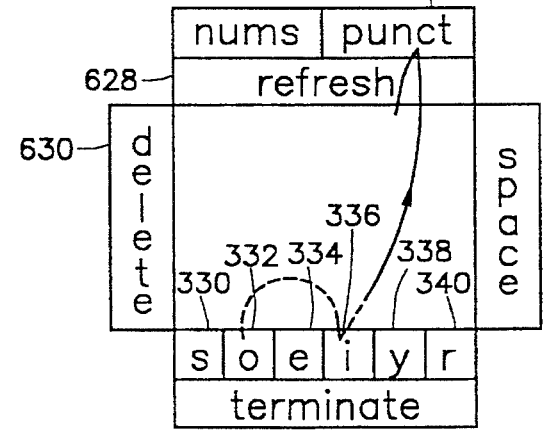
Figure 8E:
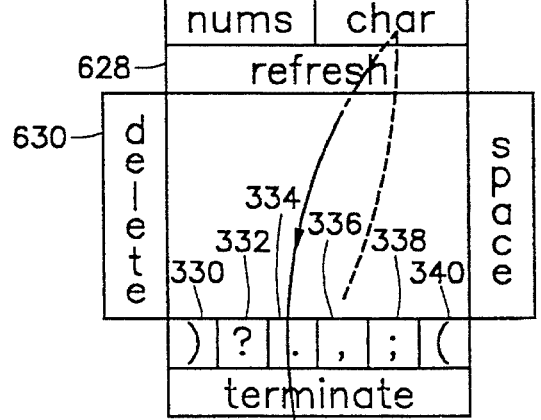
Figure 8E:
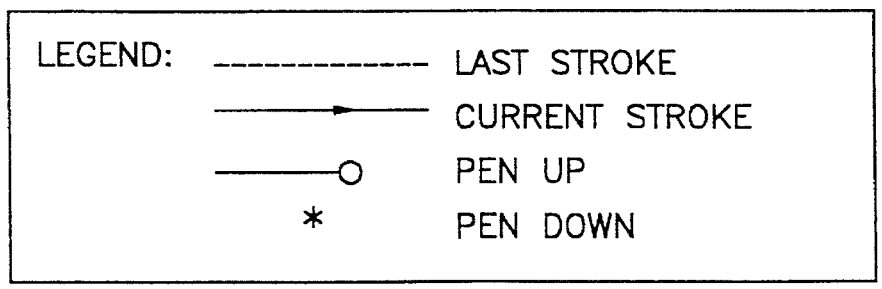

FIG. 7 shows a syntax chart 700 for string entry with the first stroke board 612. Syntax charts are sometimes called "Railroad Diagrams" because the ordered list of "stations" a train riding on such a track could make are the expressions allowed and interpreted in that syntax. The user 120 of the first stroke board 612 of FIG. 6 makes a syntactically meaningful stroke by drawing the stylus through paths which are among the paths shown on the syntax diagram in FIG. 17. Upon completion of a syntactically meaningful stroke or sequence or strokes made by the user 120 on the first stroke board 612, some action or actions will be performed.

As in cursive writing, it is possible to make many connected stokes to select long strings of characters. Unlike cursive handwriting, however, even spaces and deletions can be made without lifting the stylus. This could prove to be of substantial value in writing in physically precarious or agitated conditions.

A sequence which is not syntactically meaningful causes no action. The syntax thus reduces the probability of erroneous strokes being accepted as selections by the user 120. A stroke from the stroke space 636 into a character box and back to the stroke space 636 will, because of the syntax, not accidentally cause two adjacent characters to be selected if the stylus should by accident pass through a second character box before reaching the stroke space 636.

One action taken in response to a syntactically meaningful stroke is the selection of characters from the prediction bar 314 and the consequent refreshing of the prediction bar 314 from the task specific prediction table 128. Looking at FIG. 7, this action is performed in response to the user 120 sequentially entering the stroke space station 724, the character station 718 and the stroke space station 724. Alternatively, the user 120 could sequentially enter the pen down station 710, the character station 718 and the pen up station 728; However, the latter sequence does not lend itself to a cursive-writing style of stylus operation and thus will not be used frequently by an adept user.

Note that sequentially entering the stroke space station 724, the character station 718, the character station 718 and the stroke space station 724 is not syntactically meaningful. Thus, the syntax offers the user 120 protection from inadvertent mis-strokes by allowing the user 120 to negate the error by making that sequence of strokes meaningless.

A second action is the selection of a space. This action is performed in response to the user 120 sequentially entering the stroke space station 724, the space station 716 and the stroke space station 724. Alternatively, the user 120 could sequentially enter the pen down station 710, the space station 716 and the pen up station 728.

Note that no action is performed in response to the user 120 sequentially entering the stroke space station 724, the space station 716 and then moving the stylus into the region above or below the space box 626, as the latter sequence is syntactically meaningless.

A third action is replacing the characters in the character boxes 330, 332, 334, 336, 338 and 340, with the six characters next most likely to be selected by the user 120. This action is performed in response to the user 120 sequentially entering the stroke space station 724, the refresh station 712 and the stroke space station 724. Alternatively, the user 120 could sequentially enter the pen down station 710, the refresh station 712 and the pen up station 728.

Note that no action is performed in response to the user 120 sequentially entering the refresh station 712 and then moving the stylus into the region above or below the space box 626, as the latter sequence is syntactically meaningless. However, sequentially entering the refresh station 712, the punctuation station 720, the refresh station 712 and the stroke space station 724 is syntactically meaningful. The latter sequence results in the prediction bar 330 showing punctuation marks. A similar sequence can be used to obtain integers or mathematical symbols. The punctuation marks, integers or mathematical symbols can then be selected in response to syntactically meaningful sequences as with characters.

A fourth action is deleting the last character selected and causing the mostly likely prediction for the last state of the character entries to be restored to the prediction bar 314. This action is performed in response to the user 120 sequentially entering the stroke space station 724, the delete station 714 and the stroke space station 724. Alternatively, the user 120 could sequentially enter the pen down station 710, the delete station 714 and the pen up station 728.

A fifth action is terminating the input session and removing the first stroke board 612 from the display device 156. This action is performed in response to the user 120 sequentially entering the character station 718, the terminate station 726 and the pen up station 728. Note that no action is performed in response to the user 120 sequentially entering the character station 718, the terminate station 726 and the character station 718, as the latter sequence is not syntactically meaningful.

A sixth action is replacing the characters in the character boxes 330, 332, 334, 336, 338 and 340 with selections from a prediction table of numerals and mathematical symbols, and re-labeling the numbers box 634 of FIG. 6. This action is performed in response to the user 120 sequentially entering the refresh station 712, the numbers station 722 and the stroke space station 724. Alternatively, the user 120 could sequentially enter the pen down station 710, the numbers station 722 and the pen up station 728.

The prediction table used to generate the selections could be a simple ordered list. The numbers box 634, marked "nums" prior to the sixth action, is re-labeled "char". Selecting the sixth action a second time (by again entering the stroke described above) causes the replacement of the numerals and mathematical symbols in the character boxes 330, 332, 334, 336, 338 and 340 with predicted characters and the re-labeling of the numbers box 634 to "nums".

A seventh action is replacing the characters in the character boxes 330, 332, 334, 336, 338 and 340 with selections from a prediction table of punctuation marks and control entries (such as carriage return/line feed), and re-labeling the punctuation box 635 of FIG. 6. This action is performed in response to the user 120 sequentially entering the refresh station 712, the punctuation station 720 and the stroke space station 724. Alternatively, the user 120 could sequentially enter the pen down station 710, the punctuation station 720 and the pen up station 728.

The prediction table used to generate the selections could be a simple ordered list. The punctuation box 635, marked "punc" prior to the sixth action, is re-labeled "char". Selecting the seventh action a second time (by again entering the sequence described above) causes the replacement of the punctuation marks and control entries in the character boxed 330, 332, 334, 336, 338 and 340 with predicted characters and the re-labeling of the punctuation box 634 to "punct".

c. Sample String Entry

FIG. 8 shows a table of steps carried out by the user 120 to enter a string on the first stroke board 612. Specifically, it shows how the user 120 would enter "count." after having entered "fair ". In this FIGURE, as well as in FIGS. 11 and 14, strokes are represented as follows. A dotted line indicates the previous stroke made by the user 120. A solid line with an arrow indicates a current stroke made in the direction of the arrow. An "*" indicates a point at which the user 120 puts the stylus down or (for example) pushes the left mouse button. A "o" indicates a point at which the user 120 lifts the stylus or (for example) releases the left mouse button. Also, in the tables of FIGS. 8, 11 and 14, the entered text for a particular step is the text that is entered once the stroke shown on the stroke board of the same step has been interpreted.

In step 1, the prediction bar 314 contains the characters most likely to be entered after a space. Specifically, the prediction bar 314 contains the characters "o", "a", "t", "i", "s" and "b" in the character boxes 330 through 340, respectively. The previous stroke was made from the stroke space box 636 to the space bar 626 and back to the stroke space box 636, thereby entering the space "character". The current stroke is made from the stroke space box 636 to the refresh box 628 and back to the stroke space box 636, thereby causing the prediction bar 314 to be refreshed. The entered text is the text the user 120 had already entered: "fair".

In step 2, the prediction bar 314 has been refreshed to contain the characters next most likely to be entered after a space. Specifically, the prediction bar 314 contains the characters "m", "p", "c", "w", "f" and "n" in the character boxes 330 through 340, respectively. The previous stroke is the current stroke of step 1. The current stroke is made from the stroke space box 636 to the character box 334 and back to the stroke space box 636, thereby entering the "c" and causing the prediction bar 314 to be refreshed. The entered text is then "fair c".

In step 3, the prediction bar 314 has been refreshed to contain the characters most likely to be entered after the sequence "c". Specifically, the prediction bar 314 contains the characters "l", "n", "o", "a", "u" and "e" in the character boxes 330 through 340, respectively. The previous stroke is the current stroke of step 2. The current stroke is made from the stroke space box 636 to the character box 334 and back to stroke space box 636, thereby entering the "o" and refreshing the prediction bar 314. The entered text is then "fair co".

In step 4, the prediction bar 314 has been refreshed to contain the characters most likely to be entered after the sequence "co". Specifically, the prediction bar 314 contains the characters "l", "u", "m", "n", "r" and "d" in the character boxes 330 through 340, respectively. The previous stroke is the current stroke of step 3. The current stroke is made from the stroke space box 636 to the character box 330 and back to the stroke space box 636, thereby entering the "l" and refreshing the prediction bar 314. The entered text is then "fair col".

In step 5, the prediction bar 314 has been refreshed to contain the characters most likely to be entered after the sequence "ol". Specifically, the prediction bar 314 contains the characters "u", "v", "l", "i", "d" and "e" in the character boxes 330 through 340, respectively. The previous stroke is the current stroke of step 4. The "l" in step 4 was erroneously entered. The current stroke is therefore made from the stroke space box 636 to the delete box 630 and back to the stroke space box 636, thereby deleting the "l" and refreshing the prediction bar 314. The entered text is then "fair co".

In step 6, the prediction bar 314 has been refreshed to again contain the characters most likely to be entered after the sequence "co". Specifically, the prediction bar 314 contains the characters "l", "u", "m", "n", "r" and "d" in the character boxes 330 through 340, respectively. The previous stroke is the current stroke of step 5. The current stroke is made from the stroke space box 636 to the character box 332 and back to the stroke space box 636, thereby entering the "u" and refreshing the prediction bar 314. The entered text is then "fair cou".

In step 7, the prediction bar 314 has been refreshed to contain the characters most likely to be entered after the sequence "ou". Specifically, the prediction bar 314 contains the characters "s", "n", "r", "l", "t" and "g" in the character boxes 330 through 340, respectively. The previous stroke is the current stroke of step 6. The current stroke is made from the stroke space box 636 to, the character box 332 and back to the stroke space box 636, thereby entering the "n" and refreshing the prediction bar 314. The entered text is then "fair coun".

In step 8, the prediction bar 314 has been refreshed to contain the characters most likely to be entered after the sequence "un". Specifically, the prediction bar 314 contains the characters "e", "i", "d", "t", "c" and "a" in the character boxes 330 through 340, respectively. The previous stroke is the current stroke of step 7. The current stroke is made from the stroke space box 636 to the character box 336 and back to the stroke space, thereby entering the "t" and refreshing the prediction bar 314. The entered text is then "fair count".

In step 9, the prediction bar 314 has been refreshed to contain the characters most likely to be entered after the sequence "nt". Specifically, the prediction bar 314 contains the characters "s", "o", "e", "i", "y" and "r" in the character boxes 330 through 340, respectively. The previous stroke is the current stroke of step 8. The current stroke is made from the stroke space box 636 through the refresh box 628 to the punctuation box 635 and back through the refresh box 628 to the stroke space box 636, thereby selecting the punctuation box 635. The entered text remains "fair count". The prediction bar 314 is refreshed to contain punctuation, and the punctuation box 635 is changed to read "char".

In step 10, the prediction bar 314 has been refreshed to contain punctuation marks in response to the syntactically correct stroke through the punctuation box 635. Specifically, the prediction bar 314 contains the marks ")", "?", ".", ",", ";" and "(" in the character boxes 330 through 340, respectively. The symbol in the punctuation box 635 has changed from "punct" to "char". This is to indicate that selecting the punctuation box 635 a second time will refresh the prediction bar 314 to again contain characters. The previous stroke is the current stroke of step 9. The current stroke is made from the stroke space box 636 through the character box 334 to the terminate box 632. The stylus is lifted at a point below the terminate box 632, as indicated by a "o" 810. The current stroke has the effect of entering the "." and selecting the terminate option. The entered text is then "fair count.". In response to the selection of the terminate box 632, the stroke board display system 116 causes the first stroke board 612 to be removed from the display device 156.

7. Second Stroke Board Display Format a. Overview

Figure 9:
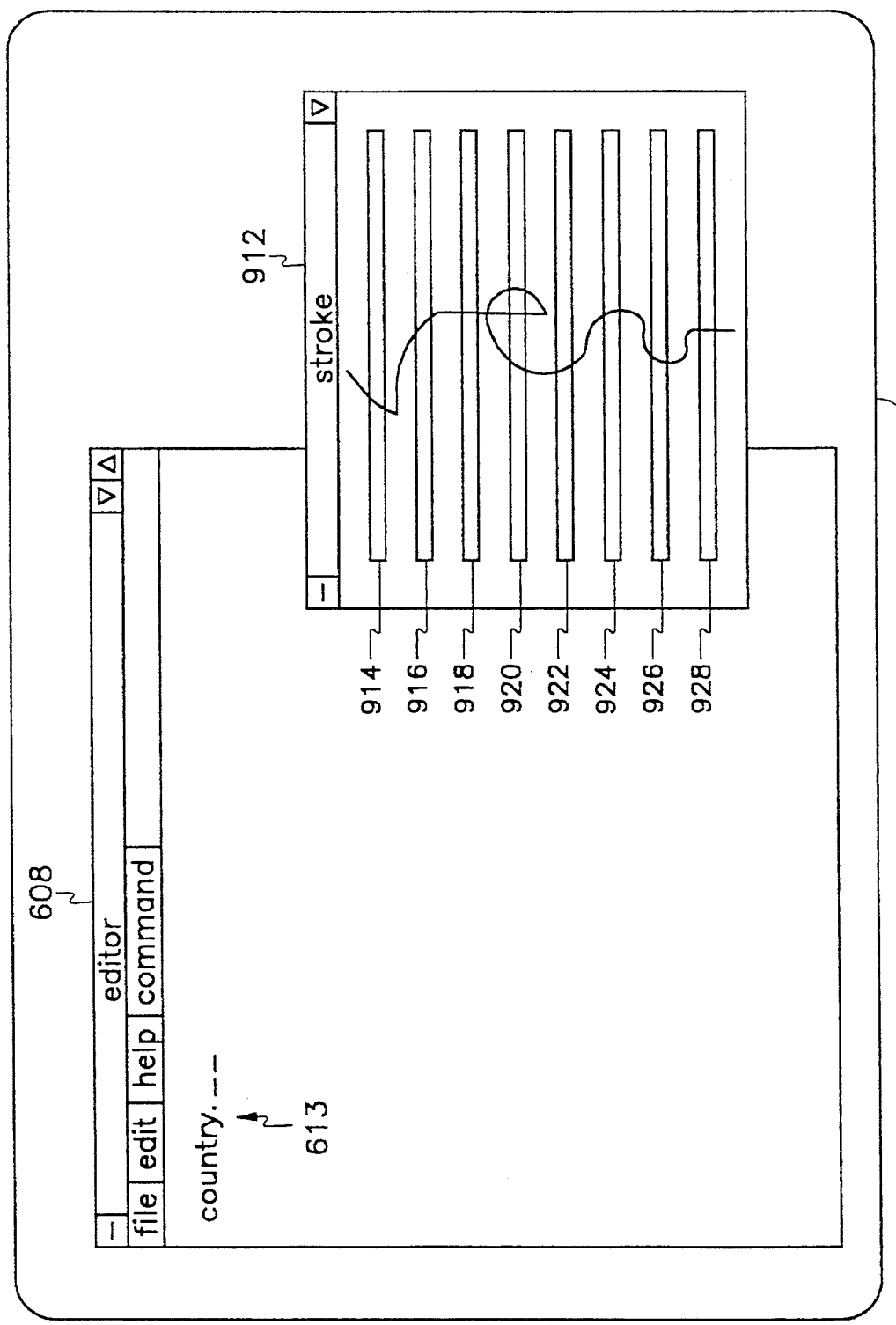
FIG. 9 shows the presentation of a second stroke board on a display device in a windowing environment.

FIG. 9 shows the presentation of a second stroke board display format on the display device 156 in a windowing environment. Presented on the display device 156 is the editor window 608 and a second stroke board 912. The editor window 608 shows the entered text 613.

The second stroke board 912 comprises a number of prediction bars 914–932 arranged one below the other on the display device 156. Each of the prediction bars 914–932 contains a large number of characters. For example, each could contain the lower case alphabet. The characters are arranged from the most likely to be selected at the left to the least likely at the right.

The user 120 enters a string by making a predominantly downward stroke selecting appropriate character boxes. New prediction bars are created and filled in response to each selection until selection of the space or terminate option. Selection of a space causes a prediction bar to be created and filled in at the top of the second stroke board 912.

b. Syntax

Figure 10:
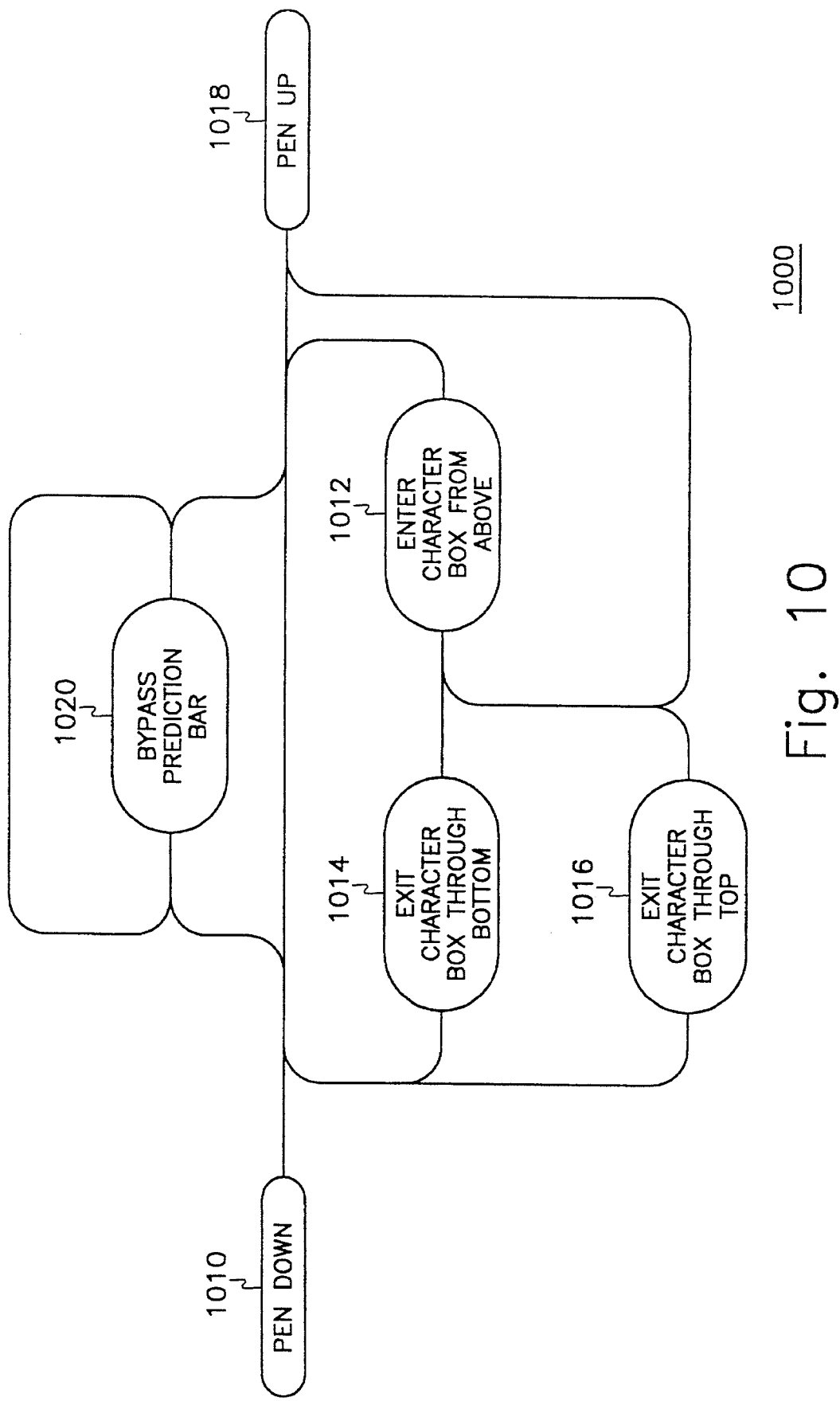
FIG. 10 shows a syntax chart for string entry with the second stroke board.

FIG. 10 shows a syntax chart 1000 for string entry with the second stroke board display format. The user 120 begins with a pen down action 1010. Essentially, the user 120 selects a character by making a stroke from above into the corresponding character box of one of the prediction bars (see action 1012). Exiting the character box through the bottom is interpreted as a request to display anew prediction bar (see action 1014). Exiting through the top is interpreted as a request to delete the last selected character (see action 1016). Lifting the pen in the character box is interpreted as a request to change the kind of prediction, for example, to numbers or to punctuation (see action 1018). A stroke which bypasses a prediction bar is interpreted as a request to enter a "space", clear the prediction bar and begin again (see action 1020). A stroke made without entering a character box and without bypassing the prediction bar (i.e., directly from action 1010 to action 1018) is interpreted as a request to terminate.

c. Sample String Entry

Figure 11A:
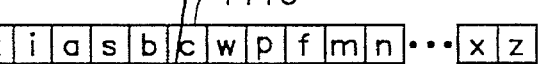
FIGS. 11A and 11B show a table of steps carried out by the user to enter a string on the second stroke board.
Figure 11B:
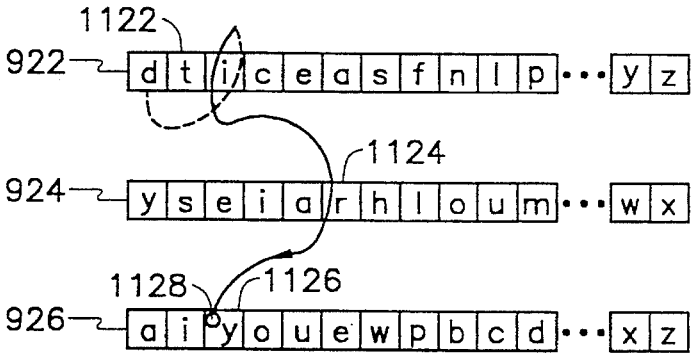

FIG. 11 shows the stroke traced by the user 120 to enter a string with the second stroke board 912. Specifically, FIG. 11 shows how the user 120 would enter the sequence "country." followed by two spaces.

In step 1, the user enters "cound". The prediction bars 914–922 are presented on the second stroke board 912. The prediction bars 914–922 contain the predicted characters in the character boxes. A current stroke made from an "." 1108 through the prediction bars 914–922 is also shown.

The prediction bar 914 contains the characters most likely to be entered at the beginning of a word. The current stroke is made downward through a character box 1110, which contains a "c". Accordingly, the first character entered is the "c" and the prediction bar 916 is created and filled with the characters most likely to be entered after the sequence "c".

The current stroke continues downward through a character box 1112, which contains an "o". Accordingly, the second character entered is the "o" and a next prediction bar 918 is created and filled with the characters most likely to be entered after the sequence "co".

The current stroke continues downward through a character box 1114, which contains a "u". Accordingly, the third character entered is the "u" and a next prediction bar 920 is created and filled with the characters most likely to be entered after the sequence "ou".

The current stroke continues downward through a character box 1116, which contains an "n". Accordingly, the fourth character entered is the "n" and the next prediction bar 922 is created and filled with the characters most likely to be entered after the sequence "un".

The current stroke continues downward through a character box 1118, which contains a "d". Accordingly, the third character entered is the "d" and the next prediction bar 924 is created and filled with the characters most likely to be entered after the sequence "nd". The current stroke does not enter the prediction bar 924, as the "d" was entered erroneously. The entered text after the current stroke of step 1 is "cound".

In step 2, the user deletes the "d". The prediction bars 914–922 are presented on the second stroke board 912. The prediction bars 914–920 and the portion of the current stroke made downward through them is unchanged from the first step. Therefore, in step 2 only the prediction bars 922 and 926 and the portion of the current stroke made through them is shown.

The prediction bar 922 still contains the characters most likely to be entered after the sequence "un". A previous stroke of step 2 is the current stroke of the first step. A current stroke of step 2 is made upward through a character box 1120 of the prediction bar 922. Accordingly, the last input character (the "d") is deleted. Note that an upward stroke through any character box of the prediction bar 922 would have the same effect.

The prediction bar 924 is then made blank, as the arrangement of its characters cannot be made until a character is entered from the prediction bar 922. The text entered after the second step is "coun".

In step 3, the user 120 enters "try." followed by two spaces. The prediction bars 914–924 are presented on the second stroke board 912. The prediction bars 914–920 and the portion of the current stroke made through them is unchanged from the first step. Therefore, in step 3 only the prediction bars 922–926 and the portion of the current stroke made through them is shown.

The prediction bar 922 still contains the characters most likely to be entered after the sequence "un". The current stroke is continued downward through a character box 1122, which contains a "t". Accordingly, the fifth character entered is the "t" and the prediction bar 924 is created and filled with the characters most likely to be entered after the sequence "nt".

The current stroke is continued downward through a character box 1124, which contains an "r". Accordingly, the sixth character entered is the "r" and the prediction bar 926 is created and filled with the characters most likely to be entered after the sequence "tr".

The current stroke is continued downward into a character box 1126, which contains a "y". Accordingly, the seventh character entered is the "y".

The user 120 then lifts the stylus from within the character box 1126, as indicated by a "o" 1128. Doing so fills the next prediction bar 928 with punctuation marks, numbers and other non-alphabetic characters. (Alternatively, doing so could extend the prediction bar 926 to include non-alphabetic characters.)

The user 120 puts the stylus down at a point indicated by a "*" 1130 between the prediction bars 926 and 928. The user 120 continues the current stroke downward through a character box 1131, which contains a ".". Accordingly, the eighth character entered is the "." and the prediction bar 930 is created containing the characters most likely to be entered after the sequence "y.".

The user 120 then continues the stroke past the side of the prediction bar 930 to a point below the prediction bar. This is interpreted as a "space" character which is appended to the entered text to form "country.". The stroke board is cleared, and a new prediction bar is displayed near the top of the second stroke board 912.

In step 4, the user 120 puts the stylus down at a point above the prediction bar 930, as indicated by a "*" 1134. Finally, desiring a second space, the user 120 bypasses the prediction bar 932. Having entered an additional space, the user lifts the stylus from point below the prediction bar 932, as indicated by a "o" 1136. Doing so causes the stroke board to be cleared and a new prediction bar to be displayed. The user 120 may now make a short stroke from a "*" 1138 to a "o" 1140 without crossing or bypassing the prediction bar 932 to request that the second stroke board 932 be terminated.

8. Third Stroke Board Display Format a. Overview

Figure 12:
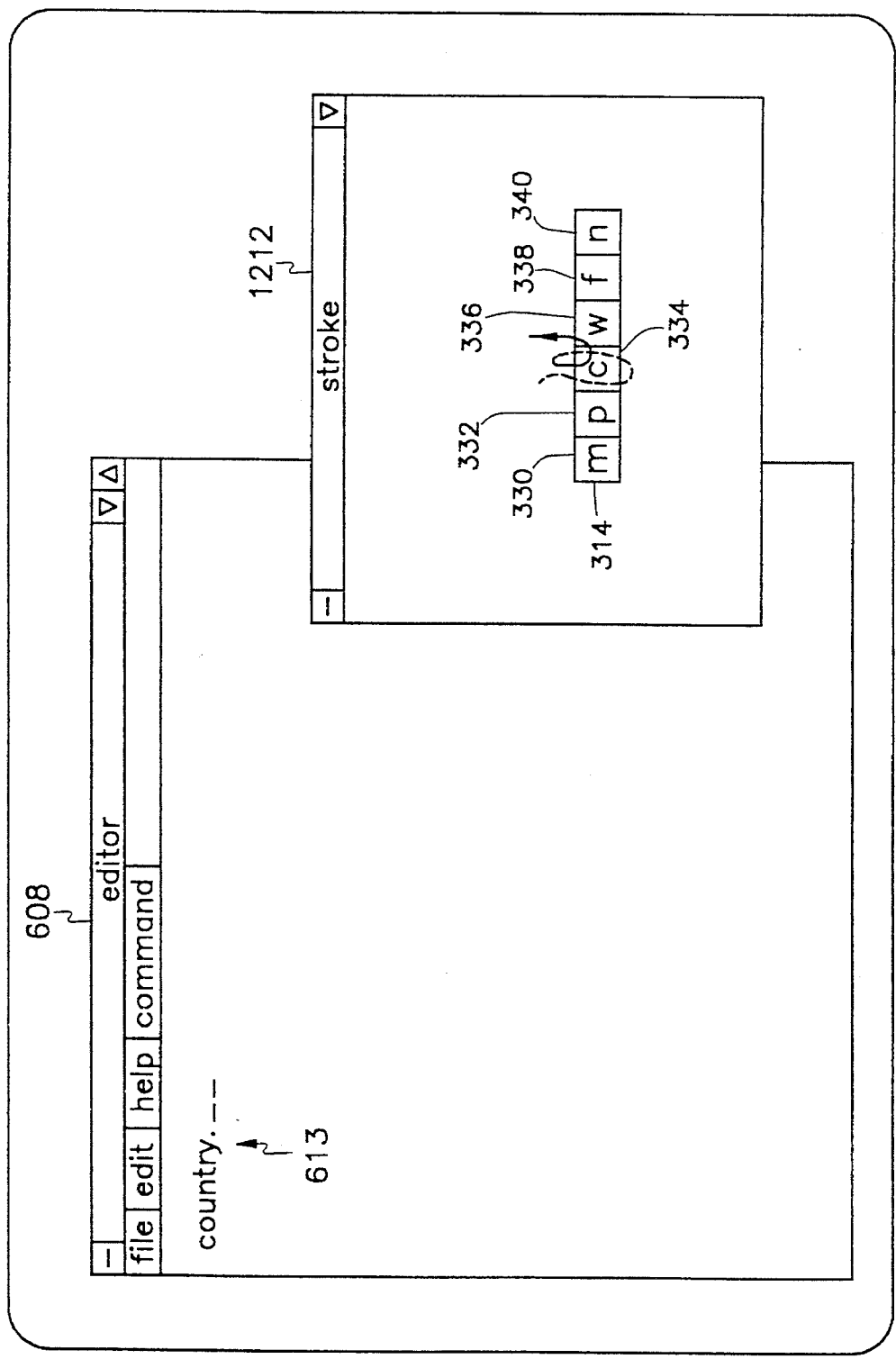
FIG. 12 shows the presentation of a third stroke board on a display device in a windowing environment.

FIG. 12 shows the presentation of a third stroke board display format on the display device 156 in a windowing environment. Presented on the display device 156 is an editor window 608, which is typical of any text editor, and a third stroke board 1212. The editor window 608 shows the entered text 613. The third stroke board 1212 comprises the prediction bar 314 with six character boxes 330, 332, 334, 336, 338 and 340, respectively and the space which surrounds the prediction bar 314.

As with the first stroke board 312, the most likely predictions are displayed in the character boxes toward the center of the prediction bar 314, and the less likely predictions are displayed in the character boxes toward the left and right. An extensive stroke syntax enables the third stroke board 1212 to provide data entry capabilities equivalent to those of the first and second stroke boards 612 and 912, respectively, notwithstanding its limited amount of displayed material.

b. Syntax

Figure 13:
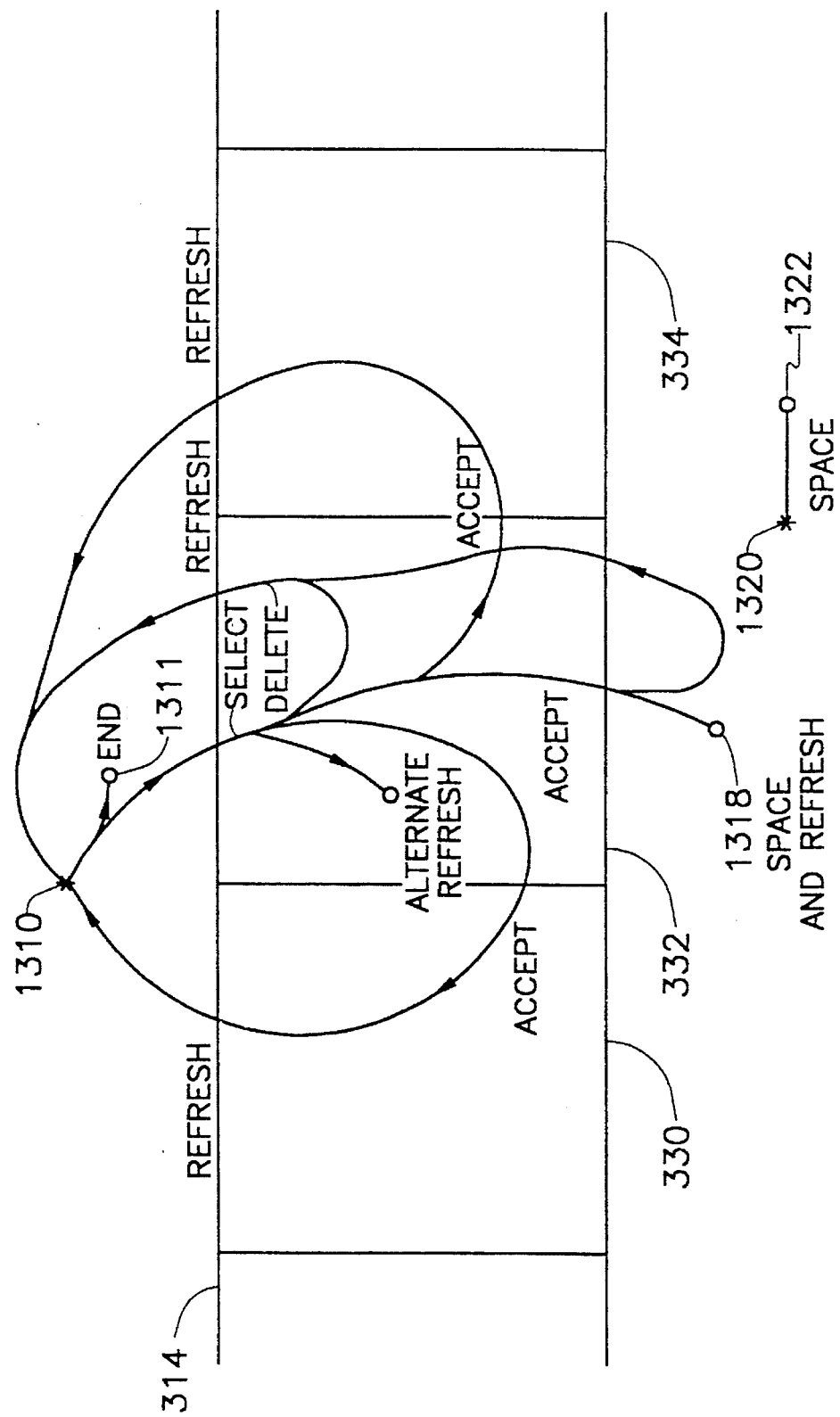
FIG. 13 shows meaningful strokes which are in the syntax of the third stroke board overlaying an array of empty character boxes.

FIG. 13 shows a stroke diagram 1300 for the third stroke board 1212. The user 120 begins a stroke by putting the stylus down above the prediction bar 314, as indicated by a "*" 1310. If the stroke also ended above the bar as indicated by a "o" 1311, the input session terminates and causes the stroke board display system 116 to terminate the third stroke board 1212 (i.e., remove it from the display device 156).

Making a selection stroke downward into the character box 332 enters the character displayed in the box.

Continuing the selection stroke into the adjacent character box 330 and upward out of the latter refreshes the prediction bar 314. Similarly, continuing the stroke into an adjacent character box 334 and upward out of the latter refreshes the prediction bar 314.

Continuing the selection stroke upward back out of the character box 332 deletes the entered character and refreshes the prediction bar 314. Continuing the selection stroke downward out of the character box 332 and then back up into the character box 332 and out the top of the latter likewise deletes the entered character and refreshes the prediction bar 314. These two refresh strokes are provided to give the user 120 latitude in the amplitude of strokes.

Continuing the selection stroke downward out of the character box 332 and then lifting the stylus from below the prediction bar 314, as indicated by a "o" 1318, enters a space after the selected character and refreshes the prediction bar 314. Additional spaces can be made by making strokes below the prediction bar 314, that is, from an "*" 1320 to a "o" 1322.

Lifting the stylus after making the selection stroke causes the prediction bar 314 to begin refreshing from an alternate character set such as numbers or punctuation marks. When this is done, the selected character is deleted.

c. Sample String Entry

Figure 14:
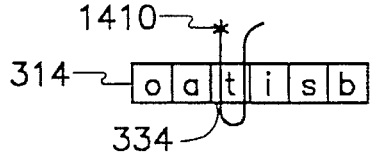
FIG. 14 shows a table of steps carried out by the user to enter a string on the third stroke board.
Figure 14:
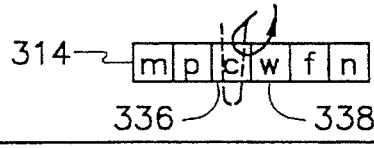
Figure 14:
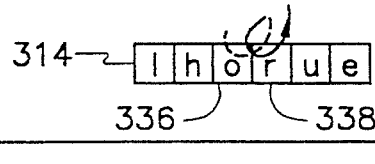
Figure 14:
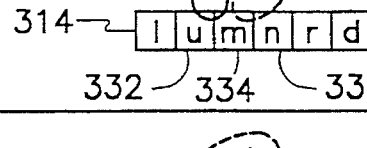
Figure 14:
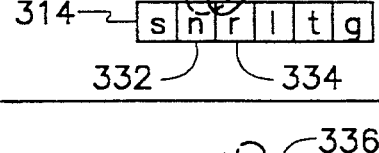
Figure 14:
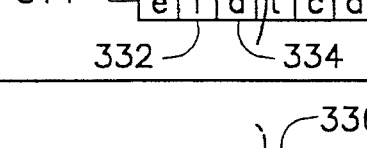
Figure 14:
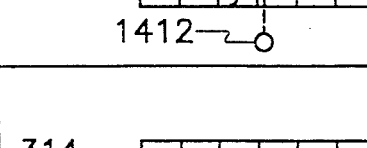
Figure 14:
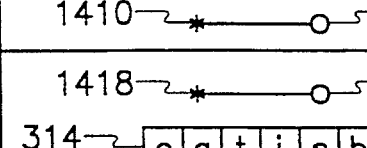
Figure 14:
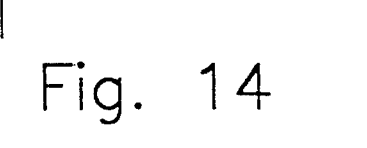

FIG. 14 shows a table of steps carried out by the user 120 to enter a string on the third stroke board 1212. Specifically, FIG. 14 shows how the user 120 would enter the word "count" followed by two spaces.

In step 1, the prediction bar 314 contains the characters most likely to be entered after a space. Specifically, the prediction bar 314 has the characters "o", "a", "t", "i", "s" and "b" in the character boxes 330–340, respectively. The user 120 puts the stylus down above the prediction bar 314, as indicated by an "*" 1410. The current stroke is made downward through the character box 334, which contains a "t", and back upward through the same box. Such a stroke selects the "t", deletes the t, and refreshes the prediction bar 314. There is no text entered after step 1.

In step 2, the prediction bar 314 has been refreshed to contain the characters next most likely to be entered after a space. Specifically, the prediction bar 314 has the characters "m", "p", "c", "w", "f" and "n" in the character boxes 330–340, respectively. The previous stroke of step 2 is the current stroke of step 1. The current stroke of step 2 is made downward into the character box 334 and upward out of the character box 336, thereby entering the "c" and refreshing the prediction bar 314. The text entered after step 2 is "c".

In step 3, the prediction bar 314 contains the characters most likely to be entered after the sequence "c". Specifically, the prediction bar 314 has the characters "l", "h", "o", "r", "u" and "e" in the character boxes 330–340, respectively. The previous stroke of step 3 is the current stroke of step 2. The current stroke of step 3 is made downward into the character box 334 and upward out of the character box 336, thereby entering the "o" and refreshing the prediction bar 314. The text entered after step 3 is "co".

In step 4, the prediction bar 314 contains the characters most likely to be entered after the sequence "co". Specifically, the prediction bar 314 has the characters "l", "u", "m", "n", "r" and "d" in the character boxes 330– 340, respectively. The previous stroke of step 4 is the current stroke of step 3. The current stroke of step 4 is made downward into the character box 332 and upward out of the character box 334 thereby entering the "u" and refreshing the prediction bar 314. The text entered after step 3 is "cou".

In step 5, the prediction bar 314 contains the characters most likely to be entered after the sequence "ou". Specifically, the prediction bar 314 has the characters "s", "n", "r", "l", "t" and "g" in the character boxes 330– 340, respectively. The previous stroke of step 5 is the current stroke of step 4. The current stroke of step 5 is made downward into the character box 332 and upward out of the character box 334 thereby entering the "n" and refreshing the prediction bar 314. The text entered after step 5 is "coun".

In step 6, the prediction bar 314 contains the characters most likely to be entered after the sequence "un". Specifically, the prediction bar 314 has the characters "e", "i", "d", "t", "c" and "a" in the character boxes 330–340, respectively. The previous stroke of step 6 is the current stroke of step 5. The current stroke of step 6 is made downward through the character box 336, thereby entering the "t" and refreshing the prediction bar 314. The text entered after step 6 is "count".

In step 7, the prediction bar 314 contains the characters most likely to be entered after the sequence "nt" Specifically, the prediction bar 314 has the characters "a", "e", "y", "s", "i" and "r" in the character boxes 330–340, respectively. The previous stroke of step 7 is the current stroke of step 6. The user 120 lifts the stylus from a point below the prediction bar 314 indicated by a "o" 1412, thereby entering a space. The text entered after step 7 is "count" followed by a space.

In step 8 the prediction bar 314 has the characters "o", "a", "t", "i", "s" and "b" in the character boxes 330–340, respectively. The user 120 puts the stylus down at a point below the prediction bar 314, as indicated by a "*" 1414. The user 120 then lifts the stylus from another point below the prediction bar 314, as indicated by a "o" 1416. Doing so enters a second space.

In step 9, the prediction bar 314 has the characters "o" "a", "t", "i", "s" and "b" in the character boxes 330–340, respectively. The user 120 puts the stylus down at a point above the prediction bar 314, as indicated by a "*" 1418. The user 120 then lifts the stylus from another point above the prediction bar, as indicated by a "o" 1420. Doing so terminates the input session and invokes the stroke board display system 116 to remove the third stroke board from the display device 156. The text displayed after step 9 remains "count" followed by two spaces.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A method for generating a word for display on a computer screen, comprising:

(a) displaying a set of statistically most common initial characters, the set including fewer than all possible initial characters, and selecting one of the displayed characters if it is a desired character;

(b) if the desired character is not displayed, refreshing the displayed characters with a set of statistically next most common initial characters until the desired character appears, and then selecting the desired character;

(c) if an additional character is desired to be selected:

(d) displaying a set of statistically most likely next characters, the set including fewer than all possible next characters, selecting one of the displayed characters if it is a desired next character, and if it is not the desired next character, refreshing the displayed characters with a set of statistically next most likely characters until the desired character is displayed, and selecting the desired next character;

(e) if an additional character is desired, repeat step (d), otherwise, quit.

2. The method of claim 1, further comprising:

displaying a bounded template having a plurality of regions bounded by lines, a plurality of the regions being occupied by displayed characters, wherein a desired character is selected by traversing one or more lines bounding the desired character in a predefined sequence.

3. The method of claim 1, further comprising:

displaying a bounded template having a plurality of regions bounded by lines, one of the regions being an open space, and a plurality of the regions being occupied by displayed characters, wherein selection of one of the displayed characters comprises traversing a line separating the open space from one of the regions bounding the one character.

* * * * *